(12) United States Patent
Sakurai

(10) Patent No.: US 11,267,077 B2
(45) Date of Patent: Mar. 8, 2022

(54) ELECTRODE SHEET MANUFACTURING APPARATUS AND POWER STORAGE DEVICE MANUFACTURING METHOD

(71) Applicant: TOYOTA JIDOSHA KABUSHIKI KAISHA, Toyota (JP)

(72) Inventor: Takahiro Sakurai, Nissin (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 643 days.

(21) Appl. No.: 16/158,532

(22) Filed: Oct. 12, 2018

(65) Prior Publication Data

US 2019/0160596 A1 May 30, 2019

(30) Foreign Application Priority Data

Nov. 28, 2017 (JP) ............................. JP2017-228036

(51) Int. Cl.
*B23K 26/38* (2014.01)
*H01M 10/04* (2006.01)
(Continued)

(52) U.S. Cl.
CPC .............. *B23K 26/38* (2013.01); *B23K 26/06* (2013.01); *B23K 26/082* (2015.10);
(Continued)

(58) Field of Classification Search
CPC .......... B23K 2101/36; B23K 2103/166; B23K 2103/172; B23K 26/06; B23K 26/082;
(Continued)

(56) References Cited

U.S. PATENT DOCUMENTS

2003/0006221 A1\* 1/2003 Hong .................. H01L 21/3043
219/121.72
2008/0108229 A1\* 5/2008 Tanaka .................. B23K 26/40
438/795

(Continued)

FOREIGN PATENT DOCUMENTS

CN 106972188 7/2017
JP 2008-135717 A 6/2008
(Continued)

OTHER PUBLICATIONS

English translation of JP 2015188908 A (Year: 2015).\*
Dan Fox, What Can a CO2 Laser Cut, Etch, or Mark?, Jul. 29, 2015, (Year: 2015).\*

*Primary Examiner* — Ibrahime A Abraham
*Assistant Examiner* — Chris Q Liu
(74) *Attorney, Agent, or Firm* — Sughrue Mion, PLLC

(57) ABSTRACT

Provided is an electrode sheet manufacturing apparatus that forms an electrode sheet by cutting a sheet stack including an electrode composite material layer and a separator provided on the electrode composite material layer. The electrode sheet manufacturing apparatus includes a laser irradiation device that irradiates the sheet stack with a first laser beam having a wavelength to be absorbed by the separator and a second laser beam having a wavelength to be absorbed by the electrode composite material layer, and a controller that controls driving of the laser irradiation device. The controller moves an irradiation position of the first laser beam relative to the sheet stack and moves an irradiation position of the second laser beam so as to follow a track of the irradiation position of the first laser beam.

4 Claims, 25 Drawing Sheets

(51) Int. Cl.

| | | |
|---|---|---|
| *H01M 4/64* | (2006.01) | |
| *B23K 26/06* | (2014.01) | |
| *H01M 10/0585* | (2010.01) | |
| *B23K 26/40* | (2014.01) | |
| *H01M 4/36* | (2006.01) | |
| *B23K 26/402* | (2014.01) | |
| *B23K 26/08* | (2014.01) | |
| *B23K 26/082* | (2014.01) | |
| *H01M 50/46* | (2021.01) | |
| *H01M 50/403* | (2021.01) | |
| *H01M 50/463* | (2021.01) | |
| *B23K 103/16* | (2006.01) | |
| *B23K 101/36* | (2006.01) | |
| *H01M 10/0525* | (2010.01) | |

(52) U.S. Cl.
CPC .......... *B23K 26/0838* (2013.01); *B23K 26/40* (2013.01); *B23K 26/402* (2013.01); *H01M 4/36* (2013.01); *H01M 4/64* (2013.01); *H01M 10/04* (2013.01); *H01M 10/0413* (2013.01); *H01M 10/0585* (2013.01); *H01M 50/403* (2021.01); *H01M 50/46* (2021.01); *H01M 50/463* (2021.01); *B23K 2101/36* (2018.08); *B23K 2103/166* (2018.08); *B23K 2103/172* (2018.08); *H01M 10/049* (2013.01); *H01M 10/0525* (2013.01)

(58) Field of Classification Search
CPC .... B23K 26/0838; B23K 26/38; B23K 26/40; B23K 26/402; H01M 10/04; H01M 10/0413; H01M 10/049; H01M 10/0525; H01M 10/0585; H01M 4/36; H01M 4/64; H01M 50/403; H01M 50/46; H01M 50/463

USPC ............ 219/121.67, 121.72, 121.64, 121.69, 219/121.84

See application file for complete search history.

(56) References Cited

U.S. PATENT DOCUMENTS

| | | | |
|---|---|---|---|
| 2011/0220468 A1 | 9/2011 | Andrews et al. | |
| 2012/0238048 A1 | 9/2012 | Yamamoto et al. | |
| 2013/0309566 A1* | 11/2013 | Umehara | H01M 4/139 |
| | | | 429/211 |
| 2014/0272543 A1 | 9/2014 | Devan et al. | |
| 2014/0361280 A1* | 12/2014 | Kuribe | H01L 27/32 |
| | | | 257/40 |
| 2017/0072512 A1 | 3/2017 | Umehara et al. | |
| 2017/0133166 A1 | 5/2017 | Oukassi et al. | |
| 2018/0138482 A1* | 5/2018 | Sakurai | H01M 10/00 |
| 2019/0267608 A1* | 8/2019 | Choi | H01M 4/139 |

FOREIGN PATENT DOCUMENTS

| | | |
|---|---|---|
| JP | 2015-188908 A | 11/2015 |
| JP | 2017-054793 A | 3/2017 |
| JP | 2018-037143 A | 3/2018 |
| JP | 2018-081857 A | 5/2018 |
| KR | 1020170031627 A | 3/2017 |
| KR | 1020170106562 A | 9/2017 |
| WO | 2017110318 A1 | 6/2017 |

* cited by examiner

COMPARATIVE EXAMPLE

COMPARATIVE EXAMPLE

COMPARATIVE EXAMPLE

ELECTRODE SHEET MANUFACTURING APPARATUS AND POWER STORAGE DEVICE MANUFACTURING METHOD

INCORPORATION BY REFERENCE

The disclosure of Japanese Patent Application No. 2017-228036 filed on Nov. 28, 2017 including the specification, drawings and abstract is incorporated herein by reference in its entirety.

BACKGROUND

1. Technical Field

The present disclosure relates to an electrode sheet manufacturing apparatus and a power storage device manufacturing method.

2. Description of Related Art

A secondary battery including a stacked electrode body has been hitherto known. The stacked electrode body includes a plurality of positive electrode sheets, a plurality of separators, and a plurality of negative electrode sheets. The positive electrode sheet, the separator, the negative electrode sheet, and the separator are sequentially stacked.

To produce such an electrode body as described above, a positive electrode sheet, a negative electrode sheet, etc. that are formed in an elongated shape are cut to a predetermined length using a laser beam, etc., and the cut positive electrode sheet, negative electrode sheet, etc. are sequentially stacked.

For example, Japanese Patent Application Publication No. 2017-54793 (JP 2017-54793 A) describes a method of cutting a sheet stack including a separator layer. The sheet stack including a separator layer includes an electrode composite material layer and a separator disposed on an upper surface of the electrode composite material layer.

To cut the above sheet stack, first, the separator is heated with a heater at a position to be irradiated with a laser. Then, a laser is applied to the position to be irradiated with a laser at which the separator has been heated, and thereby the sheet stack with a separator layer is cut.

The cutting device described in Japanese Patent Application Publication No. 2015-188908 cuts a stack, which is a workpiece, by irradiating the stack with a first laser beam and a second laser beam. The first laser beam and the second laser beam are shifted from each other by a predetermined distance in a cutting direction. This cutting device removes burrs, etc. by the second laser beam after cutting the stack by the first laser beam.

Japanese Patent Application Publication No. 2008-135717 describes a patterning step in a manufacturing process of a semiconductor device. In this step, patterning is performed by irradiating a stack including a plurality of material layers with a laser beam.

The stack includes a first material layer and a second material layer formed on an upper surface of the first material layer. The stack is irradiated with the first laser beam and the second laser beam that are in a superimposed state. The second laser beam has a wavelength to be absorbed in the second material layer. An opening is formed in the second material layer as the second material layer is irradiated with the second laser beam. As a result, the first material layer is exposed at a bottom of the opening formed in the second material layer. The first material layer is patterned as the exposed first material layer is irradiated with the first laser beam.

SUMMARY

In the technique described in JP 2017-54793 A, the separator is irradiated with a laser beam after the separator is heated. During irradiation with the laser beam, the separator is present on the upper surface of the electrode composite material layer. When the electrode composite material layer is heated by the laser beam, energy is imparted to active material particles inside the electrode composite material layer, causing the active material particles to reach high temperatures and to tend to scatter to the outside.

However, the active material particles inside the electrode composite material layer cannot easily scatter to the outside due to the separator present on the upper surface side of the electrode composite material layer. As a result, the separator is heated by the electrode composite material layer that has reached a high temperature.

The separator is damaged by being thus heated by the electrode composite material layer having reached a high temperature. Specifically, the heated electrode composite material layer causes the separator to melt and break in the melted area. When the separator breaks, portions thereof located around the breakage contract to form ridge-shaped portions. As a result, the produced electrode sheet has the ridge-shaped portions protruding upward that are formed along a cut area.

If electrode sheets having ridge-shaped portions are stacked to form an electrode body, a difference in height occurs between a central part and end parts of the electrode body.

The present disclosure provides an electrode sheet manufacturing apparatus and a power storage device manufacturing method that form an electrode sheet by cutting a sheet stack including an electrode composite material layer and a separator, and that can suppress formation of a raised portion, etc. in a cut area of the separator in that process.

A first aspect of the present disclosure relates to an electrode sheet manufacturing apparatus that forms an electrode sheet by cutting a sheet stack including an electrode composite material layer and a separator provided on the electrode composite material layer. The electrode sheet manufacturing apparatus includes a laser irradiation device that is configured to irradiate the sheet stack with a first laser beam having a wavelength to be absorbed by the separator and a second laser beam having a wavelength to be absorbed by the electrode composite material layer, and a controller that is configured to control driving of the laser irradiation device. The controller is configured to control driving of the laser irradiation device such that an irradiation position of the first laser beam moves relative to the sheet stack and that an irradiation position of the second laser beam moves so as to follow a track of the irradiation position of the first laser beam.

For example, to cut a sheet stack including a current collector foil, an electrode composite material layer formed on the current collector foil, and a separator formed on the electrode composite material layer, first, the separator can be cut by the first laser beam using the above electrode sheet manufacturing apparatus. Thus, the electrode composite material layer can be exposed, and this electrode composite material layer can be cut by the second laser beam. Since the energy of the first laser beam is appropriately absorbed by the separator, the separator can be appropriately cut even by the first laser beam having low output power.

The above electrode sheet manufacturing apparatus may further include a conveyor device configured to convey the sheet stack in a conveying direction. The laser irradiation device may irradiate the sheet stack being conveyed in the conveying direction by the conveyor device with the first laser beam and the second laser beam. The controller may be configured to control driving of the laser irradiation device such that the irradiation position of the first laser beam and the irradiation position of the second laser beam move as the sheet stack moves in the conveying direction, and that the irradiation position of the first laser beam and the irradiation position of the second laser beam move in a width direction of the sheet stack.

According to this electrode sheet manufacturing apparatus, the sheet stack can be cut along a straight line. In the above electrode sheet manufacturing apparatus, the distance between the irradiation position of the first laser beam and the irradiation position of the second laser beam in a moving direction of the first laser beam in the sheet stack may be equal to or larger than a value obtained by multiplying a time from when the separator is irradiated with the first laser beam until when the separator melts and a moving speed of the irradiation position of the second laser beam in the sheet stack.

According to this electrode sheet manufacturing apparatus, an electrode active material can be irradiated with the second laser beam after the separator is cut to form an opening.

The output power of the second laser beam may be higher than the output power of the first laser beam. According to this electrode sheet manufacturing apparatus, the output power of the first laser beam is set to be low, which can prevent the separator from melting excessively when the separator is irradiated with the first laser beam. Thus, formation of a large raised portion around the cut area of the separator can be suppressed.

The wavelength of the first laser beam may be within a range from 1500 nm to 3000 nm. The wavelength of the second laser beam may be within a range from 300 nm to 2000 nm. The wavelength of the first laser beam may be longer than the wavelength of the second laser beam.

A power storage device manufacturing method according to a second aspect of the present disclosure includes: preparing a sheet stack including an electrode composite material layer and a separator provided on the electrode composite material layer; irradiating the separator of the sheet stack with a first laser beam having a wavelength to be absorbed by the separator, and moving an irradiation position of the first laser beam relative to the sheet stack; and irradiating the sheet stack having been irradiated with the first laser beam with a second laser beam having a wavelength to be absorbed by the electrode composite material layer, and moving an irradiation position of the second laser beam relative to the sheet stack. The irradiation position of the second laser beam moves so as to follow a track of the irradiation position of the first laser beam.

This power storage device manufacturing method may further include conveying the sheet stack in a conveying direction. The sheet stack being conveyed in the conveying direction may be irradiated with the first laser beam and the second laser beam, and the irradiation position of the first laser beam and the irradiation position of the second laser beam may move in the conveying direction as well as in a width direction of the sheet stack.

The distance between the irradiation position of the first laser beam and the irradiation position of the second laser beam in a moving direction of the first laser beam in the sheet stack may be equal to or larger than a value obtained by multiplying a time from when the separator is irradiated with the first laser beam until when the separator melts and a moving speed of the irradiation position of the second laser beam. The output power of the second laser beam may be higher than the output power of the first laser beam. The wavelength of the first laser beam may be within a range from 1500 nm to 3000 nm. The wavelength of the second laser beam may be within a range from 300 nm to 2000 nm. The wavelength of the first laser beam may be longer than the wavelength of the second laser beam.

The electrode sheet manufacturing apparatus and the power storage device manufacturing method according to the present disclosure form an electrode sheet by cutting a sheet stack including an electrode composite material layer and a separator, and can suppress formation of a raised portion, etc. in a cut area of the separator in that process.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

A manufacturing method, a manufacturing apparatus, etc. of a power storage device 1 according to an embodiment will be described using FIG. 1 to FIG. 38. Those of the components shown in FIG. 1 to FIG. 38 that are the same or substantially the same will be denoted by the same reference signs while an overlapping description thereof may be omitted.

Figure 1:
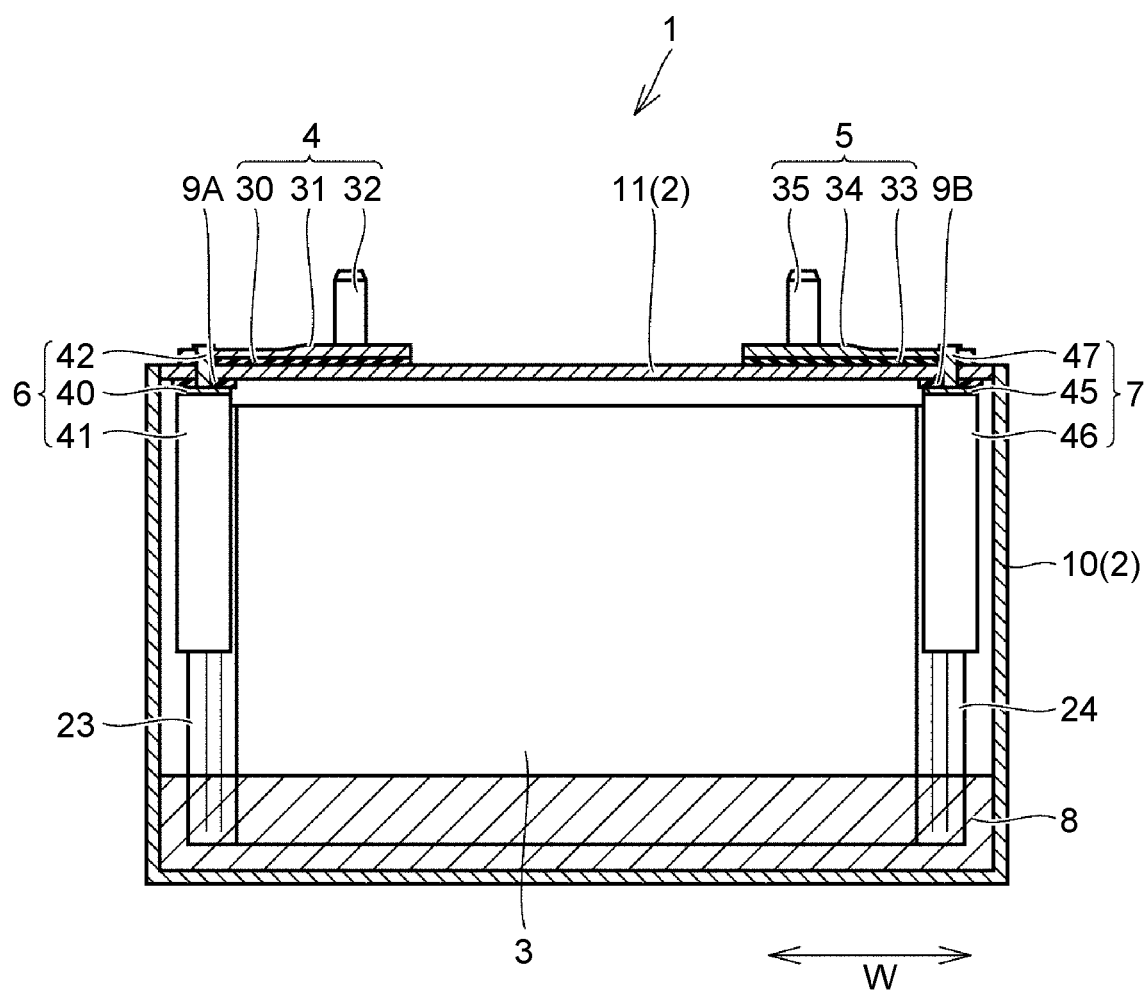
FIG. 1 is a partially sectional front view showing a power storage device 1 according to an embodiment.

FIG. 1 is a partially sectional front view showing the power storage device 1 according to the embodiment. The power storage device 1 includes a housing case 2, an electrode body 3, a positive electrode external terminal 4, a negative electrode external terminal 5, a positive electrode current collector terminal 6, a negative electrode current collector terminal 7, an electrolyte 8, and insulation members 9A, 9B.

The housing case 2 includes a case main body 10 and a lid 11. An opening that opens upward is formed in the case main body 10. The lid 11 is welded along edges of the opening of the case main body 10.

Figure 2:
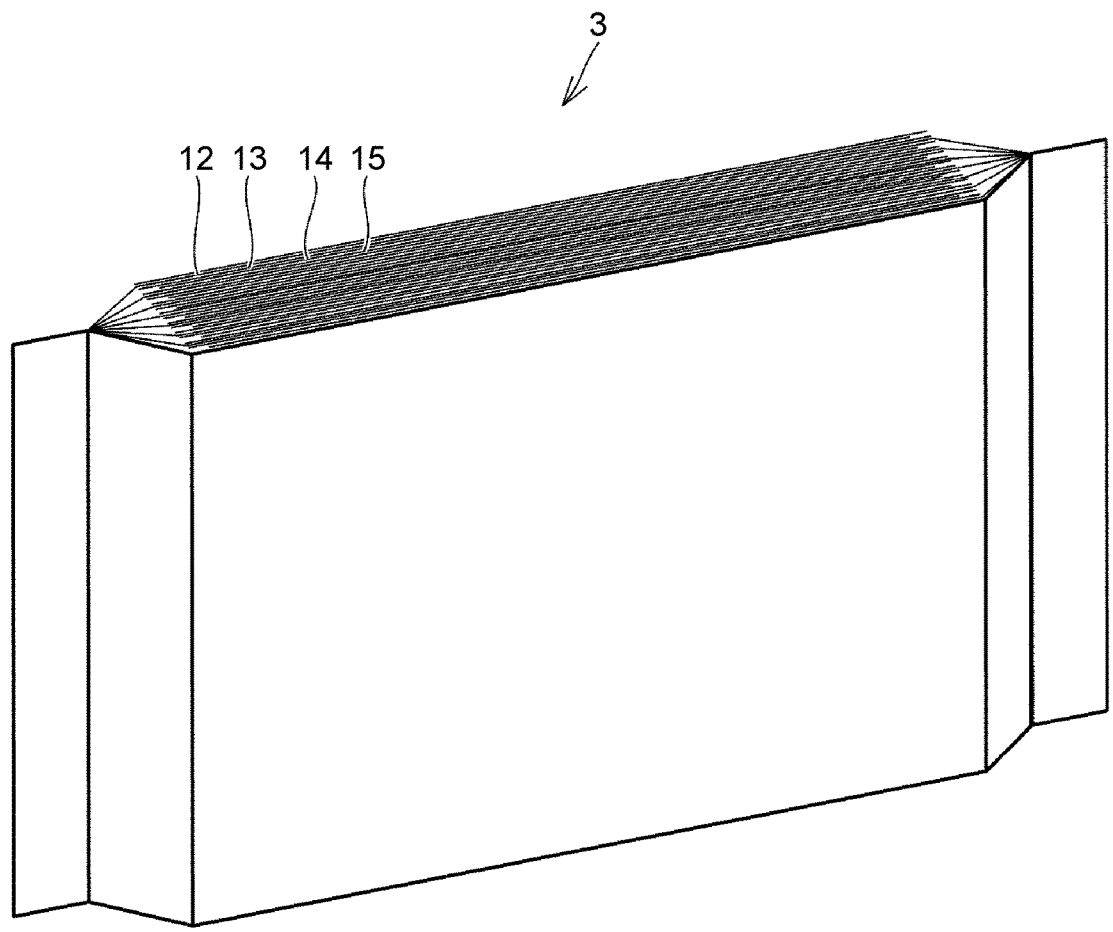
FIG. 2 is a perspective view showing an electrode body 3.
Figure 3:
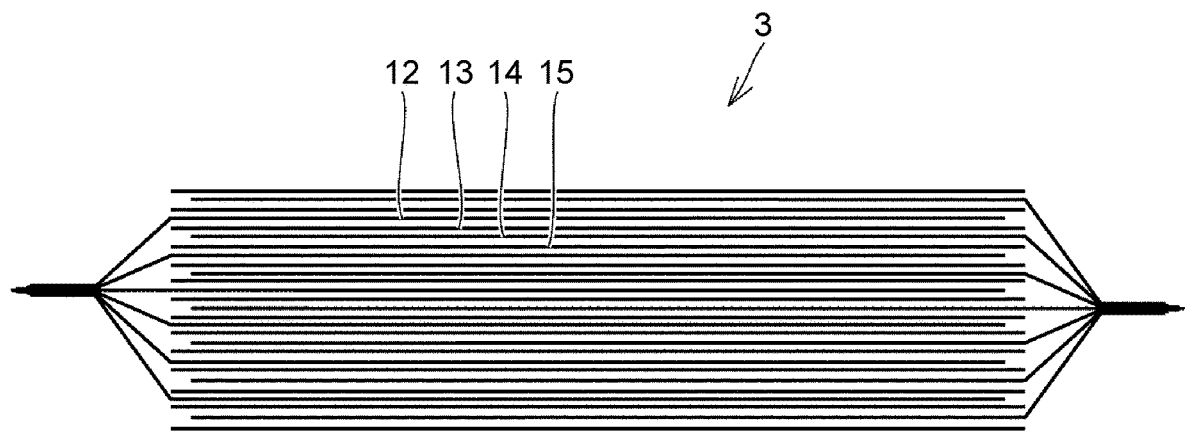
FIG. 3 is a plan view showing the electrode body 3.

The electrode body 3 is housed inside the housing case 2. FIG. 2 is a perspective view showing the electrode body 3, and FIG. 3 is a plan view showing the electrode body 3. The electrode body 3 is formed in a flat planar shape. The electrode body 3 includes a plurality of positive electrode sheets 12, a plurality of separators 13, a plurality of negative electrode sheets 14, and a plurality of separators 15.

Figure 4:
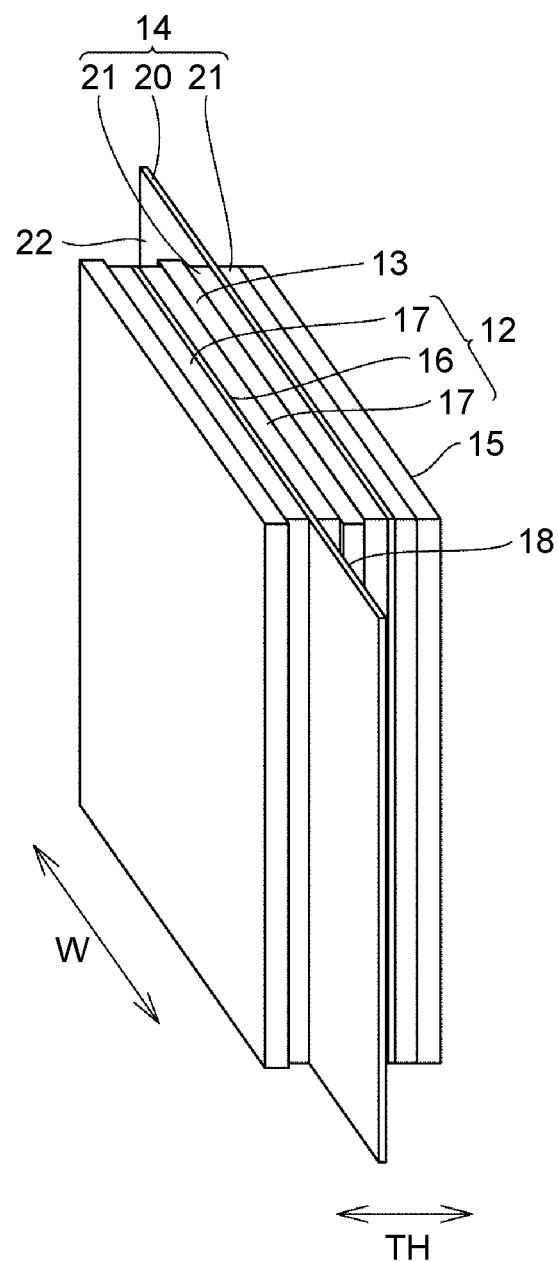
FIG. 4 is a perspective view schematically showing the electrode body 3.

FIG. 4 is a perspective view schematically showing the electrode body 3. The positive electrode sheet 12, the separator 13, the negative electrode sheet 14, and the separator 15 are arranged sequentially in a thickness direction TH.

The positive electrode sheet 12 includes a metal foil 16 and positive electrode composite material layers 17. For example, the metal foil 16 is formed by aluminum or aluminum alloy. The metal foil 16 has a rectangular shape. The positive electrode composite material layers 17 are formed respectively on front and back surfaces of the metal foil 16. The positive electrode composite material layer 17 includes a positive electrode active material and a binder. The metal foil 16 has an uncoated portion 18 in which the positive electrode composite material layer 17 is not formed.

Examples of the positive electrode active material include a lithium-containing metal oxide and a lithium-containing phosphate. Examples of the lithium-containing metal oxide include compounds represented by $LiCoO_2$, $LiNiO_2$, and the general formula $LiNi_aCo_bO_2$ (where a+b=1, 0<a<1, and 0<b<1), compounds represented by $LiMnO_2$, $LiMn_2O_4$, and the general formula $LiNi_aCo_bMn_cO_2$ (where a+b+c=1, 0<a<1, 0<b<1, and 0<c<1), and $LiFePO_4$. Here, examples of the compound represented by the general formula $LiNi_aCo_bMn_cO_2$ include $LiNi_{1/3}Co_{1/3}Mn_{1/3}O_2$. Examples of the lithium-containing phosphate include $LiFePO_4$. For example, the average particle size of the positive electrode active material may be approximately 1 to 25 μm. The average particle size here means a particle size at 50% of an integrated value (D50) in a mass-based particle size distribution measured by a laser diffraction and scattering method.

The negative electrode sheet 14 includes a metal foil 20 and negative electrode composite material layers 21. For example, the metal foil 20 is formed by copper or copper alloy. The negative electrode composite material layers 21 are formed respectively on front and back surfaces of the metal foil 20.

The negative electrode composite material layer 21 includes a negative electrode active material and a binder. For example, natural graphite particles can be adopted as the negative electrode active material. The size of the natural graphite particles is approximately 80 μm. The binder includes 1 wt % of sodium carboxymethylcellulose (CMC) and 1 wt % of styrene-butadiene rubber (SBR). The metal foil 20 has an uncoated portion 22 in which the negative electrode composite material layer 21 is not formed.

The uncoated portion 22 of the negative electrode sheet 14 and the uncoated portion 18 of the positive electrode sheet 12 are disposed at opposite sides of the electrode body 3 in a width direction W. The separators 13, 15 are disposed between the positive electrode sheet 12 and the negative electrode sheet 14. The separators 13, 15 are formed by a polyethylene porous film, etc.

In FIG. 2 and FIG. 3, a positive electrode is formed by the plurality of the positive electrode sheets 12 and a negative electrode is formed by the plurality of the negative electrode sheets 14.

In FIG. 1, the positive electrode external terminal 4 and the negative electrode external terminal 5 are disposed on an upper surface of the lid 11. The positive electrode external terminal 4 and the negative electrode external terminal 5 are disposed apart from each other in the width direction W of the power storage device 1.

The positive electrode external terminal 4 includes an insulation member 30, a metal plate 31, and a terminal bolt 32. The insulation member 30 is disposed on the upper surface of the lid 11. The metal plate 31 is disposed on an upper surface of the insulation member 30. The terminal bolt 32 is provided so as to protrude upward from an upper surface of the metal plate 31.

The negative electrode external terminal 5 includes an insulation member 33, a metal plate 34, and a terminal bolt 35. The insulation member 33 is disposed on the upper surface of the lid 11. The metal plate 34 is disposed on an upper surface of the insulation member 33. The terminal bolt 35 is provided so as to protrude upward from an upper surface of the metal plate 34.

The positive electrode current collector terminal 6 includes a seat 40, a leg 41, and a shaft 42. The seat 40 has a plate shape. The leg 41 is formed so as to extend downward from the seat 40, and is welded to the positive electrode 23 of the electrode body 3. The shaft 42 is formed so as to protrude upward from an upper surface of the seat 40. An upper end of the shaft 42 reaches the upper surface of the metal plate 31, and an upper end of the shaft 42 is swaged. As the upper end of the shaft 42 is swaged, the positive electrode current collector terminal 6 engages with the metal plate 31.

The insulation member 9A is disposed between the seat 40 and the lid 11, and keeps the positive electrode current collector terminal 6 and the lid 11 insulated from each other.

The negative electrode current collector terminal 7 includes a seat 45, a leg 46, and a shaft 47. The seat 45 has a plate shape. The leg 46 is formed so as to extend downward from the seat 45, and is welded to the negative electrode 24 of the electrode body 3. The shaft 47 is formed so as to protrude upward from an upper surface of the seat 45. An upper end of the shaft 47 reaches the upper surface of the metal plate 34, and the upper end of the shaft 47 is swaged. As the upper end of the shaft 47 is swaged, the negative electrode current collector terminal 7 engages with the metal plate 34.

The insulation member 9B is disposed between the seat 45 and the lid 11, and keeps the negative electrode current collector terminal 7 and the lid 11 insulated from each other.

Figure 5:
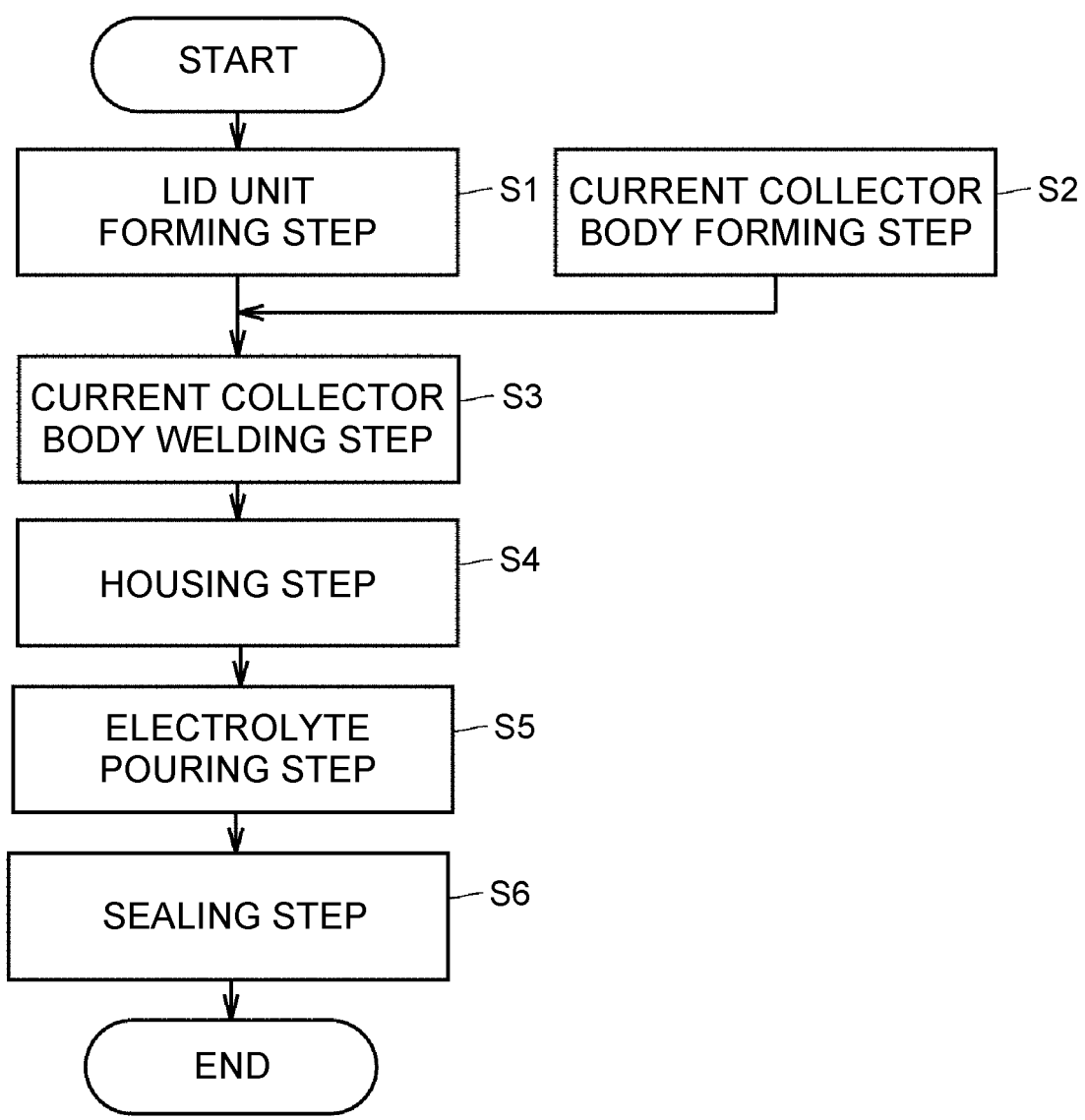
FIG. 5 is a manufacturing flowchart showing a manufacturing method of manufacturing the power storage device 1.

FIG. 5 is a manufacturing flowchart showing a manufacturing method of manufacturing the power storage device 1 configured as has been described above. A manufacturing process of manufacturing the power storage device 1 includes a lid unit forming step S1, a current collector body forming step S2, a current collector body welding step S3, a housing step S4, an electrolyte pouring step S5, and a sealing step S6.

Figure 6:
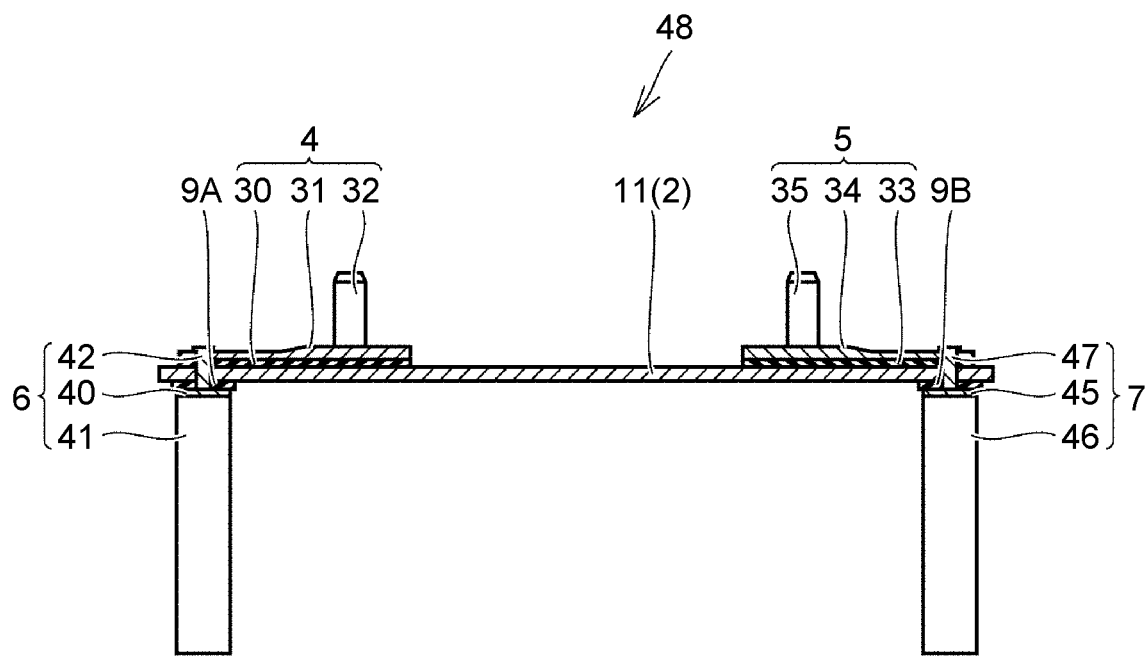
FIG. 6 is a sectional view schematically showing a lid unit forming step S1.

FIG. 6 is a sectional view schematically showing the lid unit forming step S1. The lid unit forming step S1 is a step of forming a lid unit 48 by integrating the lid 11, the positive electrode external terminal 4, the negative electrode external terminal 5, the positive electrode current collector terminal 6, and the negative electrode current collector terminal 7.

Specifically, the shaft 42 of the positive electrode current collector terminal 6 is inserted into a through-hole formed in the insulation member 9A, a through-hole formed in the lid 11, a through-hole formed in the insulation member 30, and a through-hole formed in the metal plate 31. Then, the upper end of the shaft 42 protruding from the upper surface of the metal plate 31 is swaged. Thus, the positive electrode external terminal 4, the lid 11, the insulation member 9A, and the positive electrode current collector terminal 6 are integrally coupled together.

The shaft 47 of the negative electrode current collector terminal 7 is inserted into a through-hole formed in the insulation member 9B, a through-hole formed in the lid 11, a through-hole formed in the insulation member 33, and a through-hole formed in the metal plate 34. Then, the upper end of the shaft 47 protruding from the upper surface of the metal plate 34 is swaged to integrally couple together the negative electrode external terminal 5, the insulation member 9B, and the negative electrode current collector terminal 7. Thus, the lid unit 48 is formed.

Figure 7:
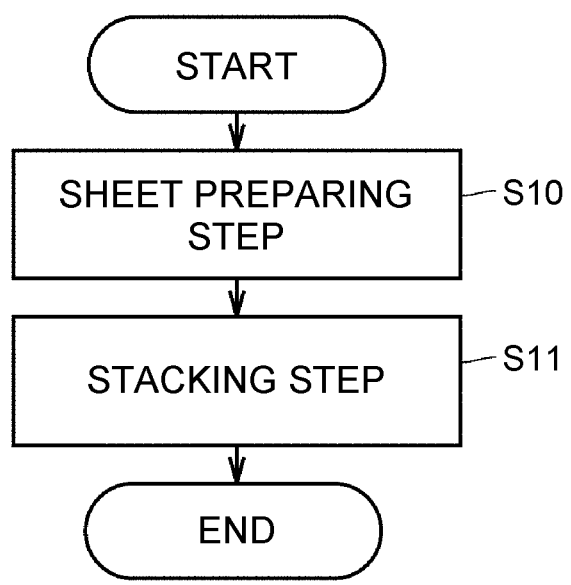
FIG. 7 is a manufacturing flowchart specifically showing a current collector body forming step S2 to show a manufacturing process of forming the electrode body 3.

FIG. 7 is a manufacturing flowchart specifically showing the current collector body forming step S2 to show a manufacturing process of forming the electrode body 3. The current collector body forming step S2 includes a sheet preparing step S10 and a stacking step S11.

The sheet preparing step S10 includes steps of preparing a positive electrode sheet and a negative electrode sheet. In this embodiment, the negative electrode sheet has a separator provided on each of front and back surfaces.

Figure 8:
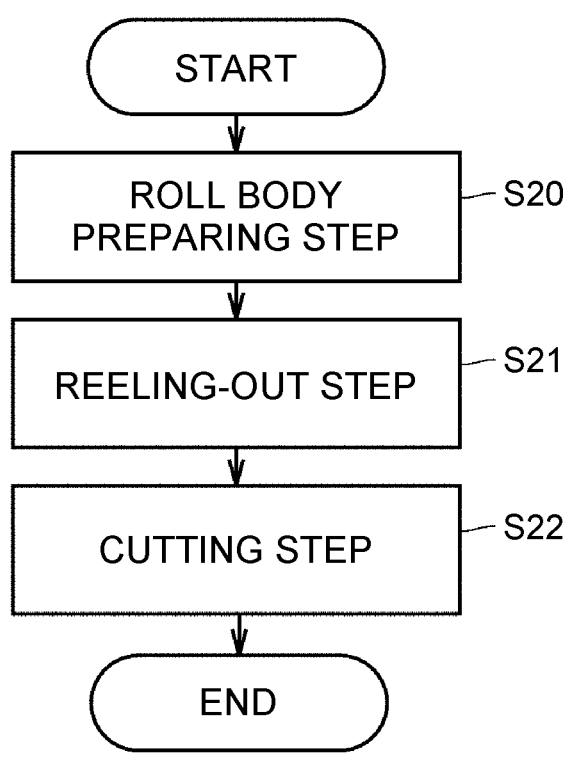
FIG. 8 is a flowchart showing a step of preparing a negative electrode sheet in a sheet preparing step S10.

FIG. 8 is a flowchart showing the step of preparing the negative electrode sheet in the sheet preparing step S10. This step of preparing the negative electrode sheet includes a roll body preparing step S20, a reeling-out step S21, and a cutting step S22.

Figure 9:
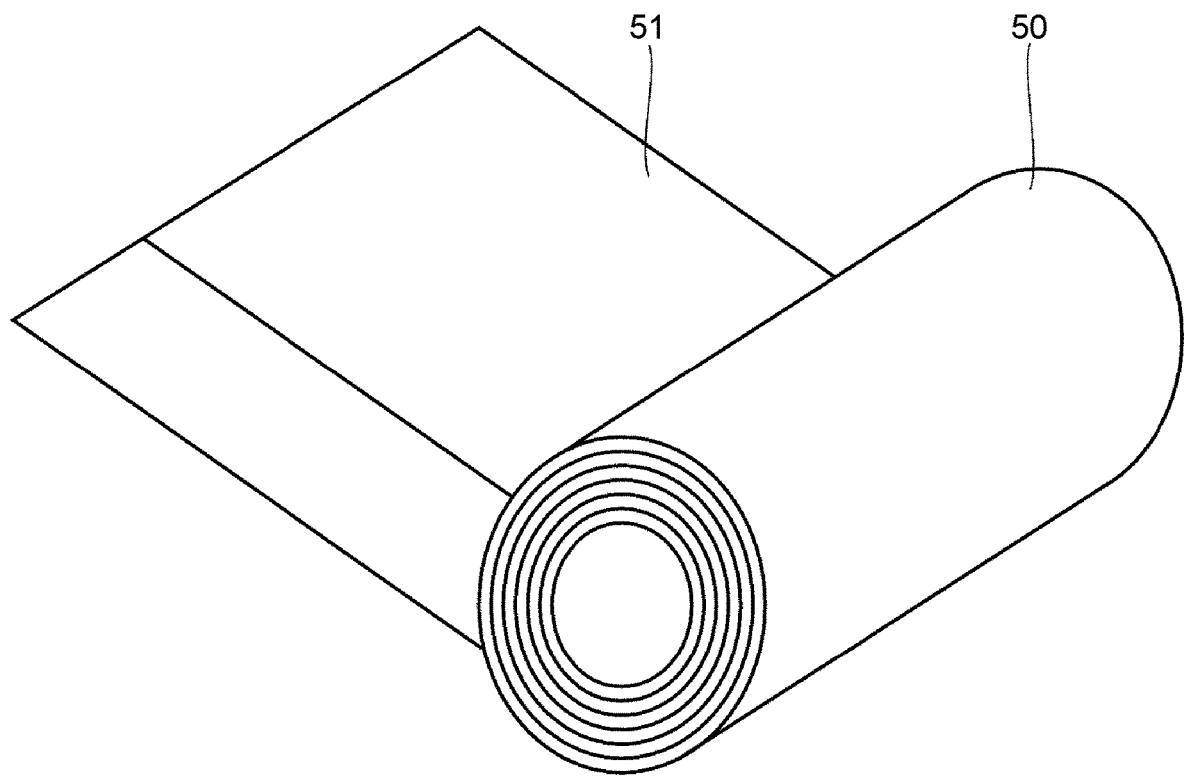
FIG. 9 is a perspective view schematically showing a step of preparing a roll body of a negative electrode.

FIG. 9 is a perspective view schematically showing a step of preparing a roll body of a negative electrode (a step of preparing a negative electrode sheet stack 51). A roll body 50 is formed by rolling up the negative electrode sheet stack 51.

Figure 10:
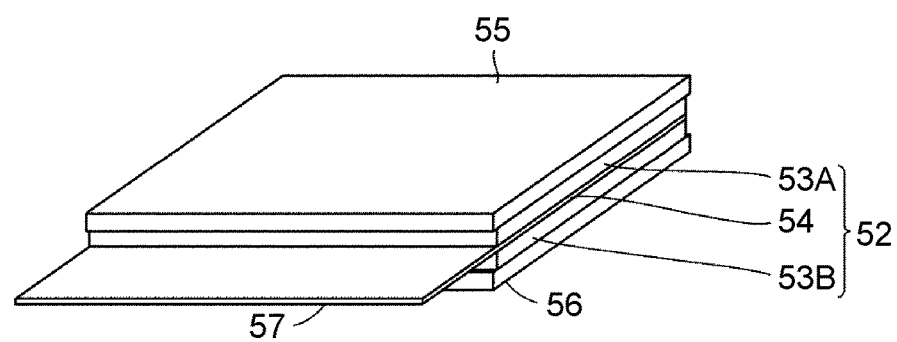
FIG. 10 is a perspective view schematically showing a part of a negative electrode sheet stack 51.

FIG. 10 is a perspective view schematically showing a part of the negative electrode sheet stack 51. The negative electrode sheet stack 51 includes a negative electrode sheet 52, a separator sheet 55, and a separator sheet 56. The separator sheets 55, 56 are bonded to the negative electrode sheet 52.

The negative electrode sheet 52 includes a metal foil 54 and negative electrode composite material layers 53A, 53B. The metal foil 54 is formed by aluminum or aluminum alloy. The negative electrode composite material layers 53A, 53B include a negative electrode active material and a binder. The negative electrode composite material layer 53A is formed on an upper surface of the metal foil 54, and the negative electrode composite material layer 53B is formed on a lower surface of the metal foil 54. The metal foil 54 also has an uncoated portion 57.

Figure 11:
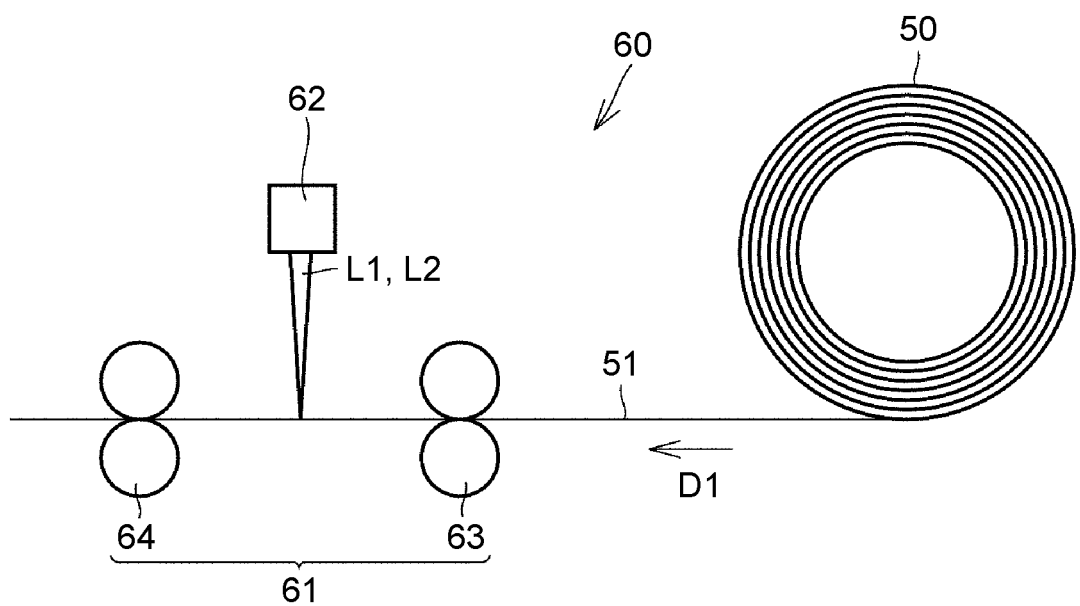
FIG. 11 is a schematic view schematically showing a reeling-out step S21 and a cutting step S22.

FIG. 11 is a schematic view schematically showing the reeling-out step S21 and the cutting step S22. The reeling-out step S21 and the cutting step S22 are performed by an electrode sheet manufacturing apparatus 60.

The electrode sheet manufacturing apparatus 60 includes a reeling-out device 61 and a cutting device 62. The reeling-out device 61 includes a roller device 63 and a roller device 64 that are disposed apart from each other in a reeling-out direction D1.

The negative electrode sheet stack 51 of the roll body 50 is reeled out in the reeling-out direction D1 by the roller device 63 and the roller device 64. The reeling-out direction D1 corresponds to the "conveying direction" of the present specification, and the reeling-out step S21 corresponds to the "step of conveying the negative electrode sheet stack 51 in the conveying direction."

The cutting device 62 cuts the negative electrode sheet stack 51 at a position between the roller device 63 and the roller device 64.

Figure 12:
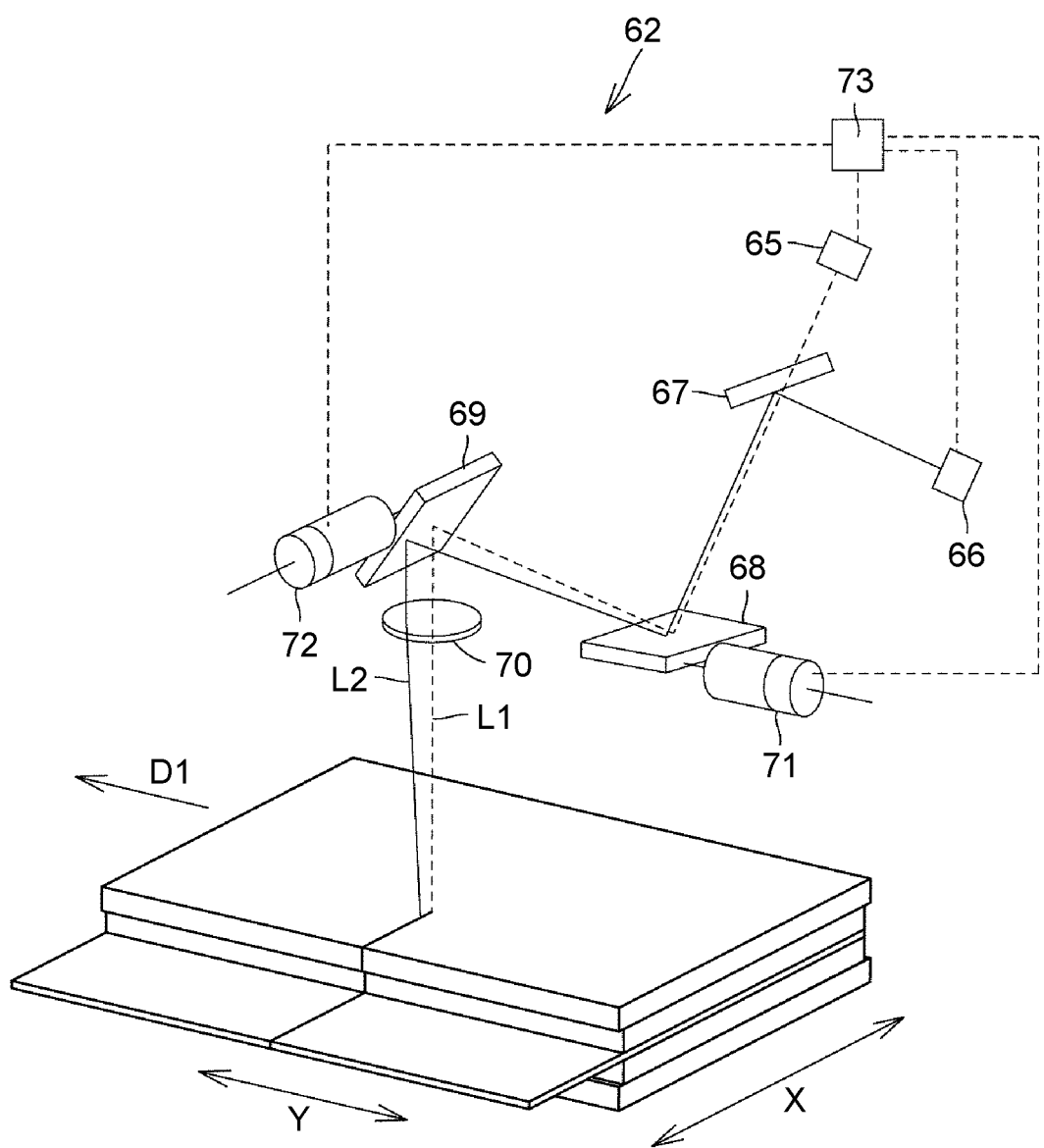
FIG. 12 is a perspective view schematically showing a cutting device 62.

In this embodiment, the cutting device 62 is a laser cutting device, particularly a galvano laser cutting device. Alternatively, a flatbed laser cutting device may be adopted. FIG. 12 is a perspective view schematically showing the cutting device 62.

The cutting device 62 includes a first laser oscillator 65, a second laser oscillator 66, a one-way mirror 67, an X-axis scanning mirror 68, a Y-axis scanning mirror 69, an fθ lens 70, motors 71, 72, and a controller 73.

For the first laser oscillator 65, a thulium fiber laser, a $CO_2$ laser, etc. can be adopted. The wavelength of a laser beam L1 emitted by the first laser oscillator 65 is not shorter than 1500 nm nor longer than 3000 nm, or is approximately 10400 nm. The wavelength of the laser beam L1 is preferably not shorter than 1500 nm nor longer than 2500 nm. The wavelength of the laser beam L1 is more preferably not shorter than 1800 nm nor longer than 2100 nm. When a $CO_2$ laser is adopted for the first laser oscillator 65, the wavelength of the laser beam L1 should be 10400 nm.

Figure 13:
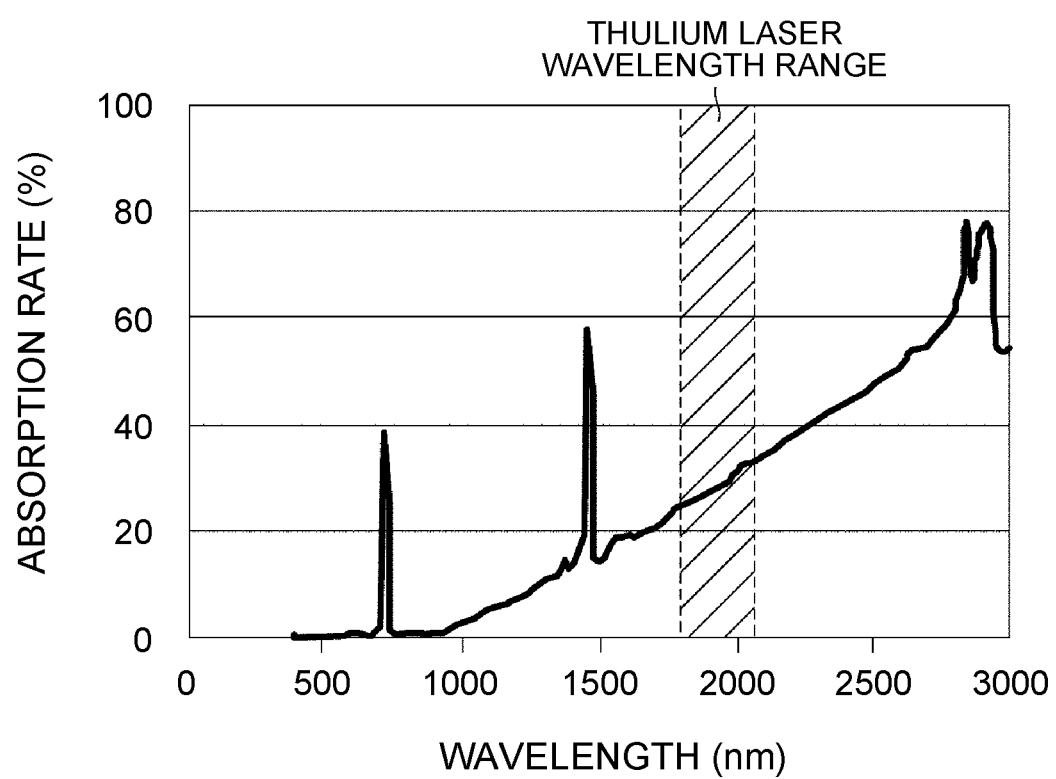
FIG. 13 is a graph showing a relationship between the wavelength absorption rate of a separator sheet 56 and the wavelength of a laser beam.

FIG. 13 is a graph showing a relationship between the wavelength absorption rate of the separator sheet 56 and the wavelength of a laser beam. The vertical axis and the horizontal axis of the graph shown in FIG. 13 represent the absorption rate (%) and the wavelength (nm) of the laser beam, respectively.

As can be seen from FIG. 13, the separator sheet 56 shows a high absorption rate in the range of wavelengths from not shorter than 1500 nm to not longer than 3000 nm. Therefore, the laser beam L1 with a wavelength of not shorter than 1500 nm nor longer than 3000 nm can appropriately cut the separator sheet 56. It can also be seen that the absorption rate of the separator sheet 56 is sufficiently high also in the range of wavelengths from not shorter than 1500 nm to not longer than 2500 nm.

When a thulium fiber laser is adopted for the first laser oscillator 65, the wavelength of the laser beam L1 is not shorter than 1500 nm nor longer than 2500 nm due the characteristics of the thulium fiber laser. This is because the range in which a laser beam with high output power can be emitted using a thulium fiber laser is from not shorter than 1500 nm to not longer than 2500 nm. As can be seen from FIG. 13, the absorption rate of the separator sheet 56 is high also in this range of wavelengths.

For the second laser oscillator 66, an ytterbium fiber laser, etc. can be adopted. For example, the wavelength of a laser beam L2 emitted from the second laser oscillator 66 is not shorter than 300 nm nor longer than 2000 nm. In this embodiment, the wavelength of the laser beam L2 is 1064 nm.

Figure 14:
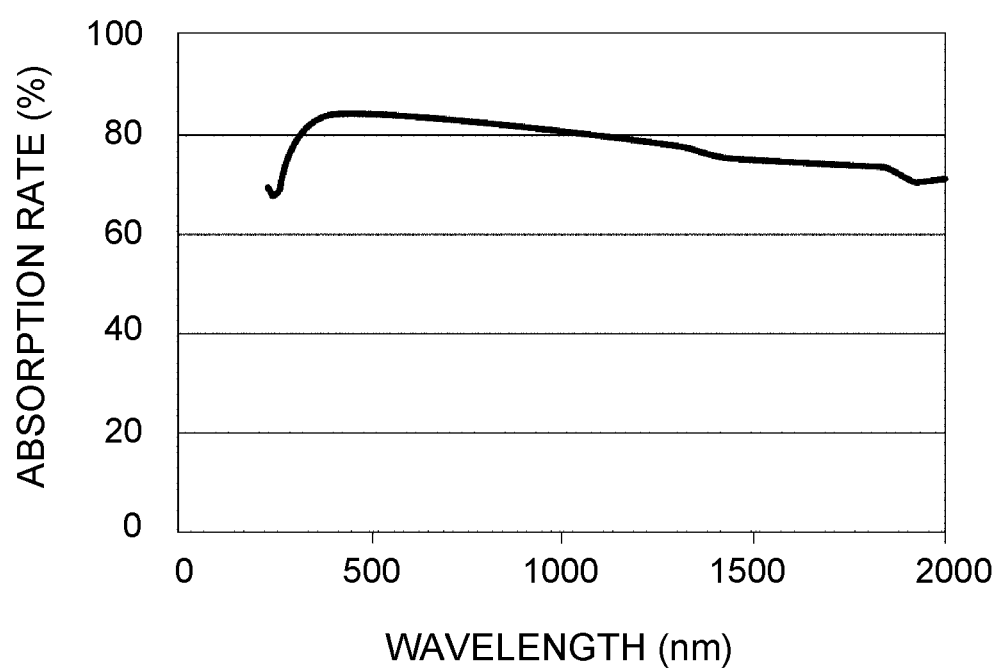
FIG. 14 is a graph showing a relationship between the absorption rate of a negative electrode active material and the wavelength of a laser beam.

FIG. 14 is a graph showing a relationship between the absorption rate of the negative electrode active material and the wavelength of a laser beam. The vertical axis and the horizontal axis of the graph represent the absorption rate (%) of the negative electrode active material and the wavelength (nm) of the laser beam, respectively.

As can be seen from this graph, the negative electrode active material has a high absorption rate of the laser beam in the range of wavelengths from not shorter than 300 nm to not longer than 2000 nm. Therefore, the laser beam L2 with a wavelength of not shorter than 300 nm nor longer than 2000 nm can appropriately supply thermal energy to the negative electrode active material. The negative electrode composite material layer can be thereby appropriately cut.

Back to FIG. 12, the one-way mirror 67 functions as an optical path constituent element. The motor 71 adjusts the rotational position of the X-axis scanning mirror 68. The motor 72 adjusts the rotational position of the Y-axis scanning mirror 69. The fθ lens 70 is a condensing lens. In FIG. 12, the X-direction is a width direction of the negative electrode sheet stack 51 and the Y-direction is a length direction of the negative electrode sheet stack 51.

The operation of the electrode sheet manufacturing apparatus 60 of the above configuration when the electrode sheet manufacturing apparatus 60 is used to cut the negative electrode sheet stack 51 will be described. As the reeling-out device 61 is driven, the negative electrode sheet stack 51 is reeled out of the roll body 50 in the reeling-out direction D1 (reeling-out step S21). The reeling-out speed in the reeling-out direction D1 is 40 m/min. The cutting device 62 cuts the negative electrode sheet stack 51 at a position between the roller device 63 and the roller device 64 (cutting step S22).

The laser beam L1 is emitted from the first laser oscillator 65. The laser beam L1 passes through the one-way mirror 67 and is reflected by the X-axis scanning mirror 68. The laser beam L1 reflected by the X-axis scanning mirror 68 is condensed by the fθ lens 70 and applied to the negative electrode sheet stack 51.

Similarly, the laser beam L2 is emitted from the second laser oscillator 66. The laser beam L2 is reflected by the one-way mirror 67. The laser beam L2 reflected by the one-way mirror 67 is reflected by the X-axis scanning mirror 68. The laser beam L2 reflected by the X-axis scanning mirror 68 is reflected by the Y-axis scanning mirror 69, passes through the fθ lens 70, and is applied to the negative electrode sheet stack 51. The output power (W) of the laser beam L2 is higher than the output power (W) of the laser beam L1.

As the motor 71 and the motor 72 are driven, the irradiation positions of the laser beams L1, L2 are adjusted. The fθ lens 70 adjusts the foci of the laser beam L1 and the laser beam L2.

Figure 15:
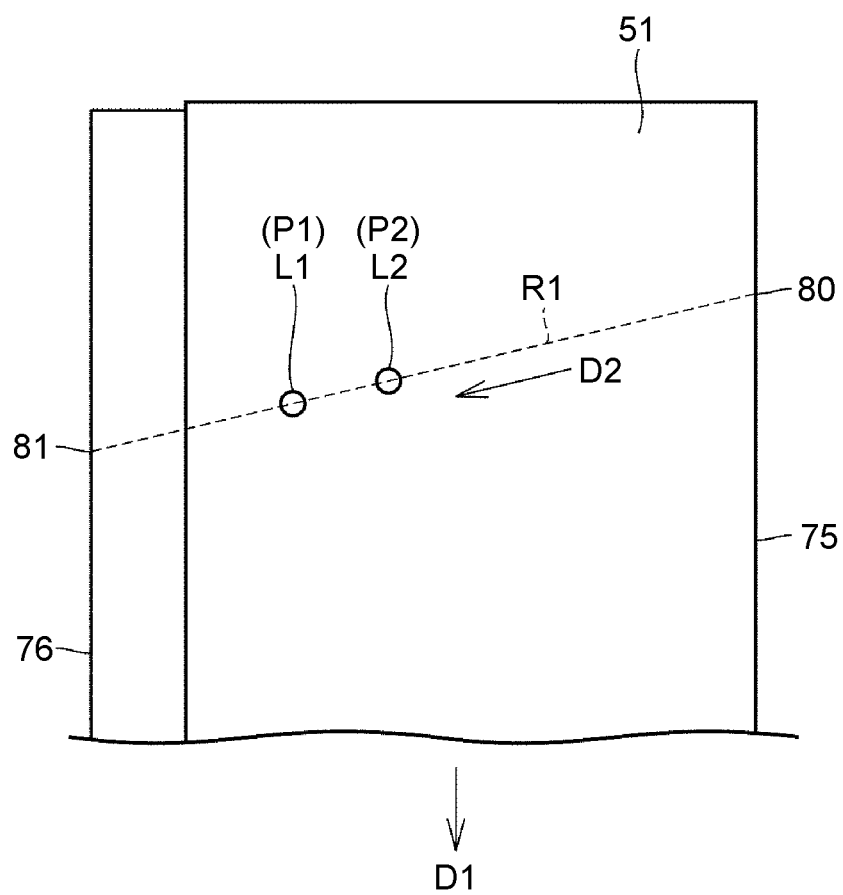
FIG. 15 is a plan view showing a scanning direction of a laser beam L1 and a laser beam L2.

FIG. 15 is a plan view showing a scanning direction of the laser beam L1 and the laser beam L2. The negative electrode sheet stack 51 has side edges 75, 76 extending in the reeling-out direction D1. The uncoated portion 57 is disposed along the side edge 76. In this case, the negative electrode sheet stack 51 moves in the reeling-out direction D1.

In the example shown in FIG. 15, the cutting device 62 scans the laser beams L1, L2 from a start position 80 on the side edge 75 side toward an end position 81 on the side edge 76 side.

As seen from a spatial perspective, a scanning route R1 leading from the start position 80 to the end position 81 is a route that extends in the width direction of the negative electrode sheet stack 51 from the start position 80 to the end position 81 while being gradually oriented in the reeling-out direction D1.

The negative electrode sheet stack 51 is cut by moving the laser beams L1, L2 from the start position 80 to the end position 81 while moving the negative electrode sheet stack 51 in the reeling-out direction D1.

In FIG. 15, an irradiation position P1 is the irradiation position of the laser beam L1 and an irradiation position P2 is the irradiation position of the laser beam L2.

The cutting device 62 first starts to apply the laser beam L1, and moves the irradiation position P1 of the laser beam L1 along the scanning route R1. Then, the cutting device 62 starts to apply also the laser beam L2, and moves the irradiation position P2 of the laser beam L2 along the scanning route R1.

Accordingly, the irradiation position P2 of the laser beam L2 moves over the negative electrode sheet stack 51 so as to follow the track of the irradiation position P1 of the laser beam L1.

Figure 16:
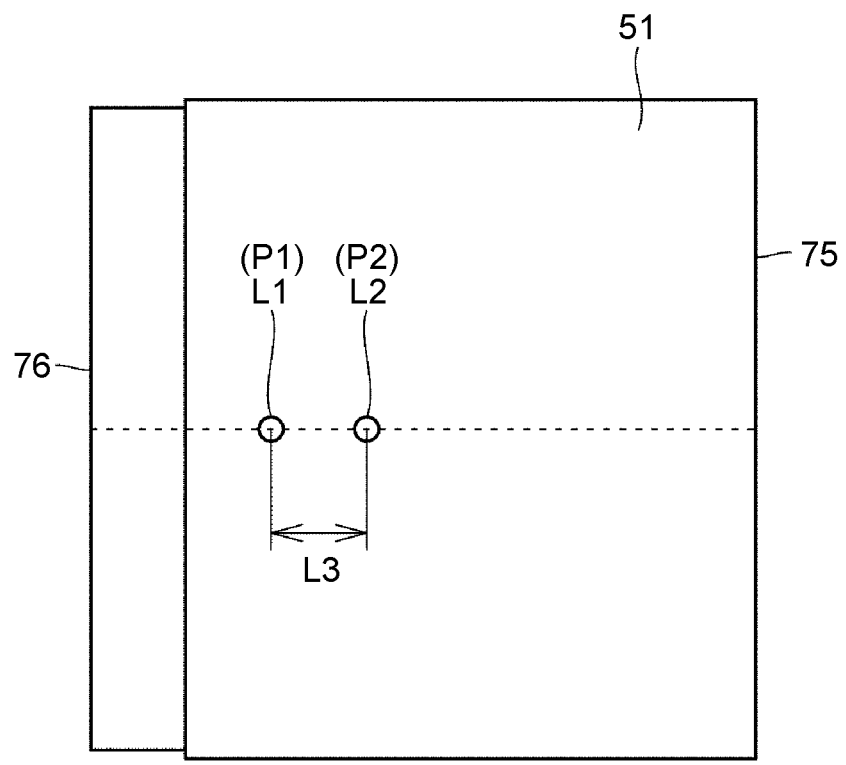
FIG. 16 is a plan view showing a moving route of irradiation positions P1, P2 of the laser beams L1, L2 in the negative electrode sheet stack 51.

FIG. 16 is a plan view showing a moving route of the irradiation positions P1, P2 of the laser beams L1, L2 in the negative electrode sheet stack 51.

In a state where the negative electrode sheet stack 51 is being reeled out in the reeling-out direction D1, the irradiation positions P1, P2 are moved in the reeling-out direction D1 as well as in the width direction of the negative electrode sheet stack 51. Thus, the negative electrode sheet stack 51 can be cut in a direction perpendicular to the side edges 75, 76 of the negative electrode sheet stack 51.

The negative electrode sheet stack 51 is cut along a cutting edge extending in the width direction of the negative electrode sheet stack 51, and the irradiation position P1 and the irradiation position P2 move so as to pass through a portion of the negative electrode sheet stack 51 at which the cutting edge is to be formed.

A moving direction of the irradiation position P1 in the negative electrode sheet stack 51 is the width direction of the negative electrode sheet stack 51. The distance between the irradiation position P1 and the irradiation position P2 in the negative electrode sheet stack 51 will be referred to as a distance L3.

For example, the conveying speed (reeling-out speed) of the negative electrode sheet stack 51 is not lower than 20 m/min nor higher than 80 m/min. The conveying speed is preferably 40 m/min. The negative electrode sheet stack 51 is continuously conveyed. For example, the scanning speed of the irradiation position P1 of the laser beam L1 and the irradiation position P2 of the laser beam L2 (the cutting speed of the laser beam L1 and the laser beam L2) is not lower than 500 mm/sec nor higher than 4000 mm/sec. The scanning speed is preferably 2000 mm/sec.

Figure 17:
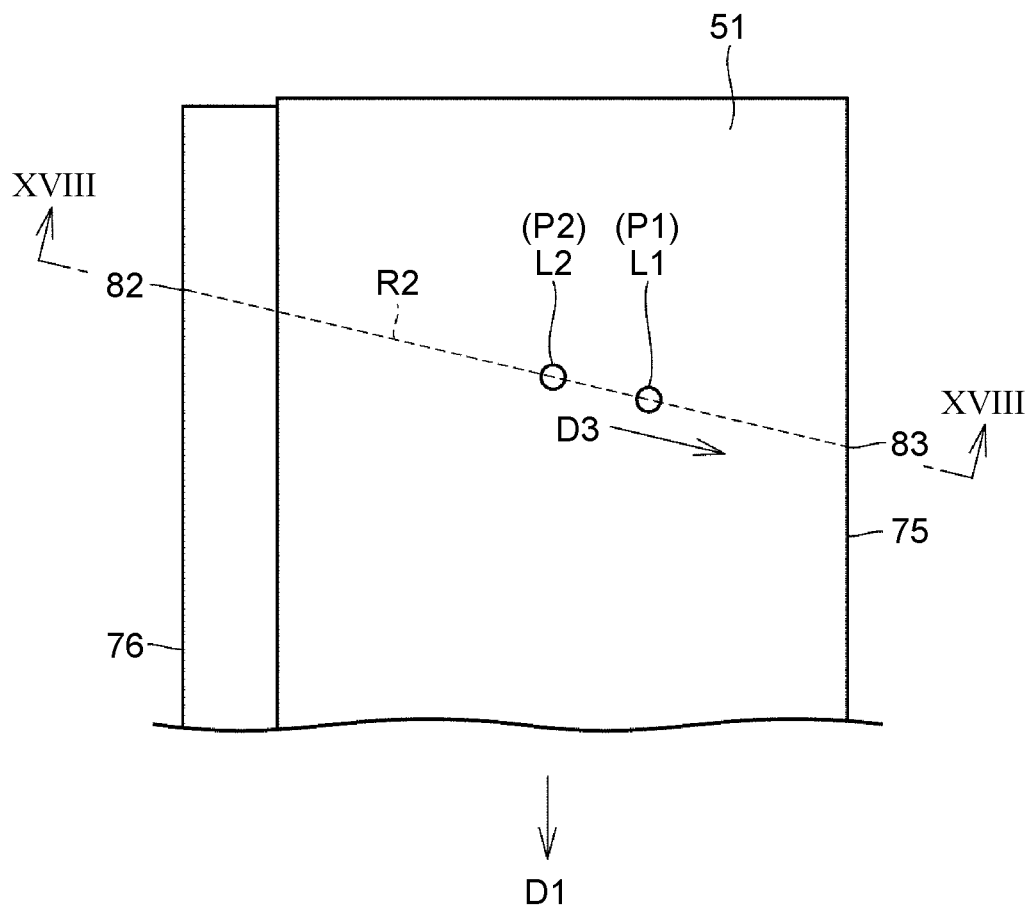
FIG. 17 is a plan view showing a scanning route R2 along which the cutting device 62 scans the laser beams L1, L2 over the negative electrode sheet stack 51 again after scanning the laser beams L1, L2 along a scanning route R1.

FIG. 17 is a plan view showing a scanning route R2 along which the cutting device 62 scans the laser beams L1, L2 over the negative electrode sheet stack 51 again after scanning the laser beams L1, L2 along the scanning route R1. A start position 82 of the scanning route R2 is located on the side edge 76 side and an end position 83 thereof is located on the side edge 75 side.

The cutting device 62 stops emitting the laser beams L1, L2 before moving the laser beams L1, L2 from the end position 81 shown in FIG. 15 to the start position 82 shown in FIG. 17. Then, the cutting device 62 rotates the X-axis scanning mirror 68 and the Y-axis scanning mirror 69 so as to move the position to be irradiated with the laser beams L1, L2 to the start position 82.

The scanning route R2 leads from the start position 82 to the end position 83 while inclining so as to be gradually oriented in the reeling-out direction D1. For example, when the length of the width of the negative electrode sheet stack 51 is 170 mm, the distance between the start position 82 and the end position 83 is 174.8 mm. The distance between the start position 82 and the end position 83 in the reeling-out direction D1 is approximately 40.5 mm.

In a state where the negative electrode sheet stack 51 is being conveyed in the reeling-out direction D1, first, the cutting device 62 resumes irradiation with the laser beam L1 and applies the laser beam L1 to the start position 82. Then, the cutting device 62 moves the irradiation position P1 of the laser beam L1 along the scanning route R2 in a scanning direction D3. Then, the cutting device 62 resumes emission of the laser beam L2 and applies the laser beam L2 to the start position 82, and moves the irradiation position P2 along the scanning route R2 in the scanning direction D3.

Thus, also along the scanning route R2, the irradiation position P2 of the laser beam L2 moves so as to follow the track of the irradiation position P1 of the laser beam L1.

Figure 18:
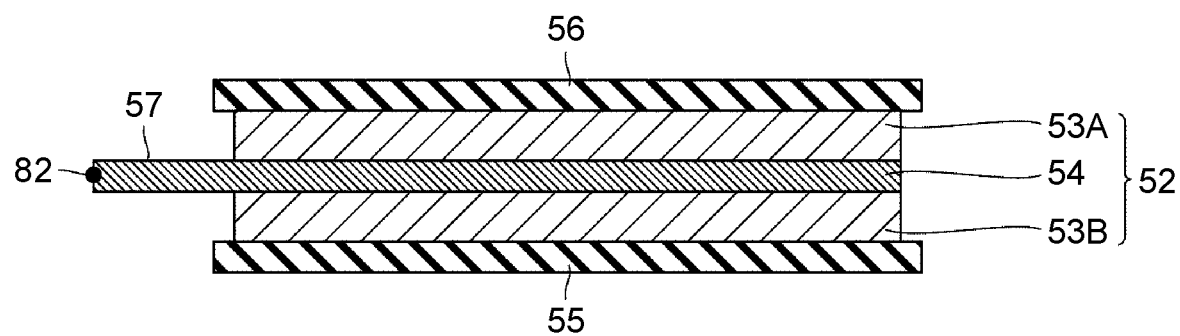
FIG. 18 is a sectional view taken along line XVIII-XVIII shown in FIG. 17.

FIG. 18 is a sectional view taken along line XVIII-XVIII shown in FIG. 17. The start position 82 is located in the uncoated portion 57 of the negative electrode sheet stack 51.

Figure 19:
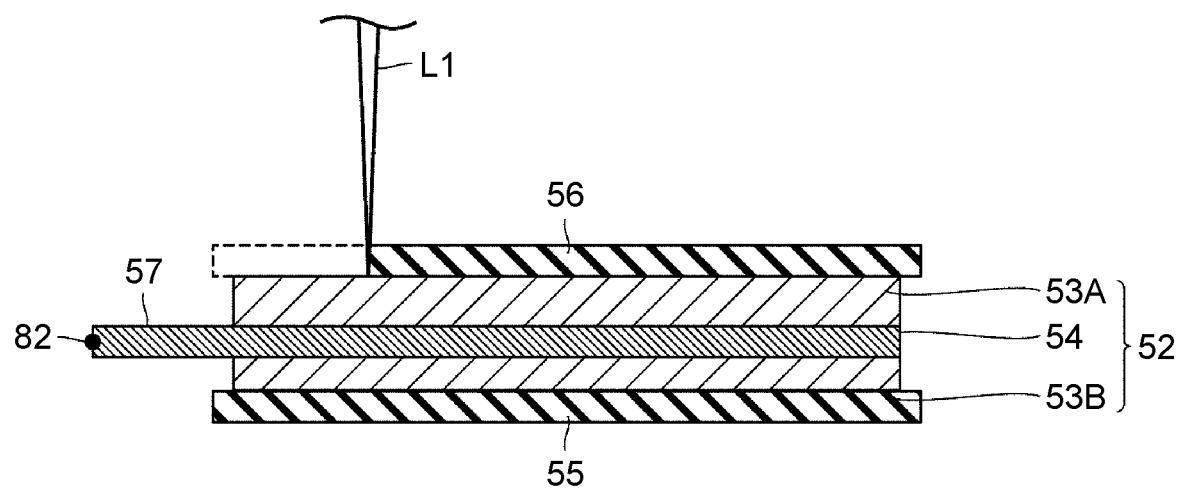
FIG. 19 is a sectional view showing a state where the laser beam L1 is applied to the negative electrode sheet stack 51.

FIG. 19 is a sectional view showing a state where the laser beam L1 is applied to the negative electrode sheet stack 51. In the state shown in FIG. 19, the laser beam L1 is scanned in the scanning direction D3 after being applied to the start position 82, and the separator sheet 56 is cut by the laser beam L1.

Here, the focus of the laser beam L1 is located in a surface of the separator sheet 56. Since the wavelength of the laser beam L1 is set to be within a range in which the absorption rate of the separator sheet 56 is high, the separator sheet 56 is melted and cut by the heat from the laser beam L1.

Figure 20:
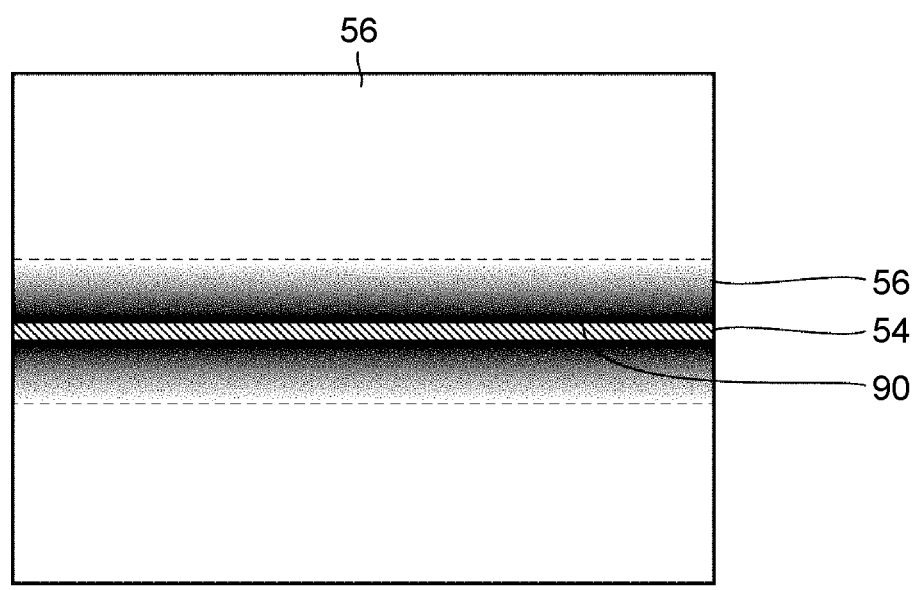
FIG. 20 is a plan view schematically showing a state where the separator sheet 56 has been cut by the laser beam L1.

FIG. 20 is a plan view schematically showing a state where the separator sheet 56 has been cut by the laser beam L1.

As shown in FIG. 20, the separator sheet 56 is cut by the laser beam L1, and a cut opening 90 is formed in the separator sheet 56 so as to extend along the scanning route R2. An upper surface of the negative electrode composite material layer 53A is exposed to the outside through the cut opening 90.

Figure 21:
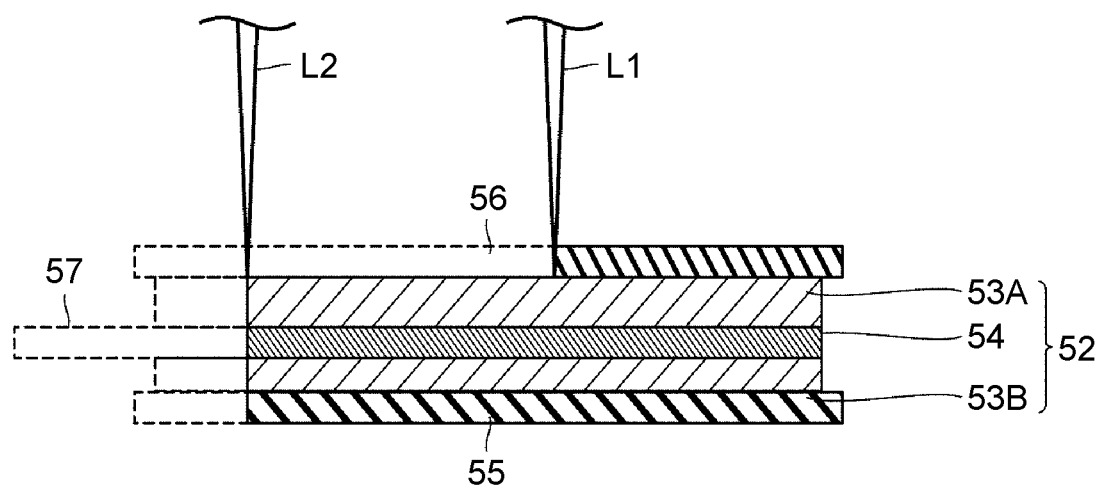
FIG. 21 is a sectional view showing how the negative electrode sheet stack 51 is cut by being irradiated with the laser beam L2.

FIG. 21 is a sectional view showing how the negative electrode sheet stack 51 is cut by being irradiated with the laser beam L2. The focus of the laser beam L2 is set in a surface of the negative electrode composite material layer 53A.

The focal position of the laser beam L1 and the focal position of the laser beam L2 are shifted from each other in a thickness direction of the negative electrode sheet stack 51. The positions of the foci are adjusted through the difference in wavelength between the laser beam L1 and the laser beam L2 based on the optical characteristics of the fθ lens 70.

For example, in this embodiment, the wavelength of the laser beam L1 is not shorter than 1800 nm nor longer than 2100 nm and the wavelength of the laser beam L2 is approximately 1064 nm.

A shift between foci due to the difference in wavelength between the laser beam L1 and the laser beam L2 is generally referred to as a chromatic aberration. To correct this chromatic aberration, it is conceivable to incorporate a chromatic aberration correction lens into the fθ lens 70. However, when there is a large difference in wavelength between the laser beam L1 and the laser beam L2, it is difficult to dispose the focal position of the laser beam L1 and the focal position of the laser beam L2 at their respective predetermined positions.

It is therefore preferable that the difference in wavelength between the laser beam L1 and the laser beam L2 fall within the range from not shorter than 500 nm to not longer than 1000 nm.

To create such a difference in wavelength, it is preferable to adopt a thulium fiber laser for the first laser oscillator 65 and adopt an ytterbium fiber laser for the second laser oscillator 66.

As the laser beam L1 enters the negative electrode composite material layer 53A, the temperature of the negative electrode composite material layer 53A rises and the binder inside the negative electrode composite material layer 53A evaporates. As the binder inside the negative electrode composite material layer 53A evaporates, the particles of the negative electrode active material are released from the binder fixing these particles. Some of the particles of the negative electrode active material released from the fixed state are scattered to the outside along with the evaporated binder.

Moreover, as the particles of the negative electrode active material are irradiated with the laser beam L1, thermal energy is imparted to these particles of the negative electrode active material. This causes the particles of the negative electrode active material to vibrate and a large number thereof to scatter to the outside.

When the laser beam L2 reaches the metal foil 54, the metal foil 54 evaporates and most of the particles of the negative electrode active material scatter to the outside along with the gaseous metal.

Further, when the laser beam L2 reaches the negative electrode composite material layer 53B, the negative electrode composite material layer 53B reaches a high temperature, so that the binder inside the negative electrode composite material layer 53B evaporates and the particles of the negative electrode active material inside the negative electrode composite material layer 53B are released from the fixed state. Then, also in the negative electrode composite material layer 53B, the particles of the negative electrode active material burst out as these particles are irradiated with the laser beam L2. Thus, the negative electrode sheet 52 is cut.

In particular, this embodiment uses the laser beam L1 having lower output power than that of the laser beam L2 to cut the separator sheet 56 and form the cut opening 90, and therefore can limit the amount of the separator sheet 56 melted to a smaller amount.

Generally, when the separator sheet 56 is irradiated with the laser beam L1, the separator sheet 56 melts and breaks in the melted area. When the separator sheet 56 breaks, portions thereof located around the breakage contract while solidifying. As a result, when the amount of the separator sheet 56 melted is large, the solidified portions rise to form ridge shapes.

However, cutting the separator sheet 56 by the laser beam L1 with low output power can suppress melting an excessive amount of the separator sheet 56. As a result, the height of the raised portions that are formed as the portions around the melted area of the separator sheet 56 contract can be made smaller.

The output power of the laser beam L1 is approximately 80 W to 120 W, and is preferably approximately 100 W. For example, the output power of the laser beam L2 is approximately 500 W to 1 kW, and is preferably approximately 700 W.

In FIG. 21, the separator sheet 55 is melted and cut as the heat from the negative electrode composite material layer 53B is transferred thereto. In this case, since most of the particles of the negative electrode active material inside the negative electrode composite material layer 53B have already scattered, the amount of heat transferred to the separator sheet 55 can be reduced. As a result, the amount of the separator sheet 55 melted can be reduced.

It is preferable that an ytterbium fiber laser be adopted for the second laser oscillator 66. This is because it is difficult to apply a laser beam with high output power of approximately 1 kW using a $CO_2$ laser.

Figure 22:
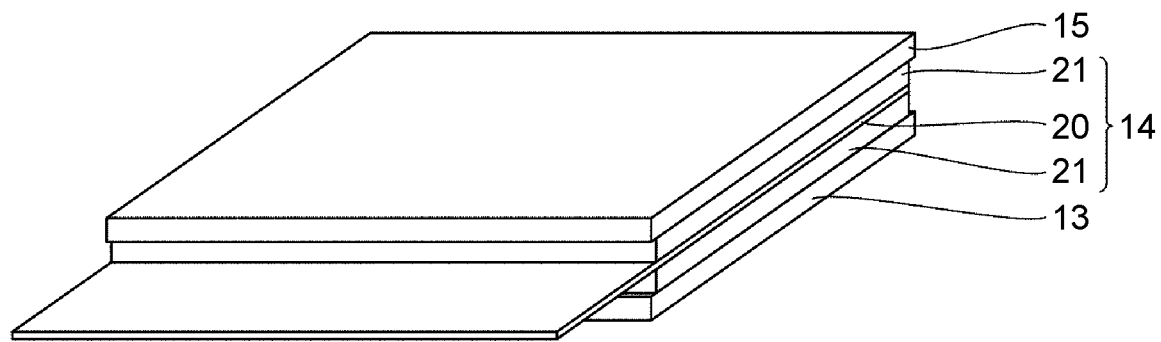
FIG. 22 is a perspective view showing a state where the negative electrode sheet stack 51 has been cut.

FIG. 22 is a perspective view showing a state where the negative electrode sheet stack 51 has been cut. The negative electrode sheet 14, the separator 13, and the separator 15 can be formed by cutting the negative electrode sheet stack 51 as described above.

The negative electrode sheet 14 is formed by cutting the negative electrode sheet 52, and the separators 15, 13 are formed by cutting the separator sheets 56, 55.

As has been described above, cutting the negative electrode sheet stack 51 using the electrode sheet manufacturing apparatus 60 can suppress formation of raised portions on upper surfaces of the separator sheets 56, 55 near the cut surfaces of the separator sheets 56, 55.

Figure 23:
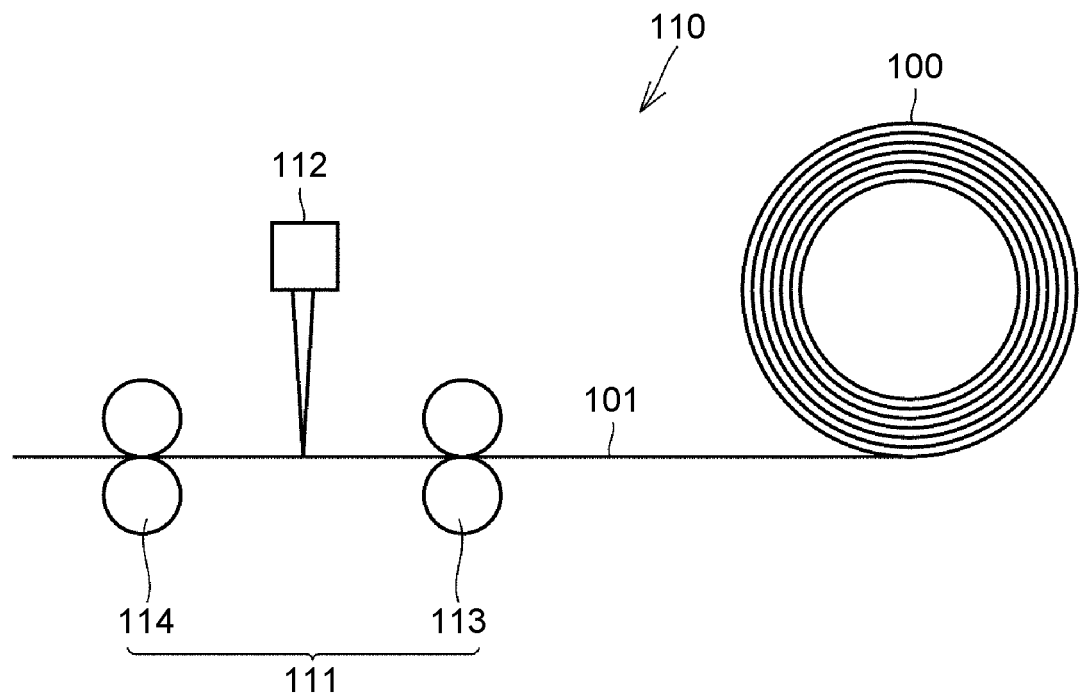
FIG. 23 is a schematic view schematically showing a step of forming a positive electrode sheet.

FIG. 23 is a schematic view schematically showing the step of forming the positive electrode sheet. This step of forming the positive electrode sheet includes steps of preparing a roll body 100, reeling out a positive electrode sheet stack 101, and cutting the positive electrode sheet stack 101.

Figure 24:
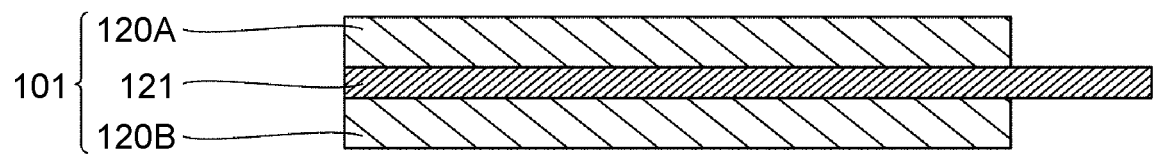
FIG. 24 is a sectional view showing a positive electrode sheet stack 101.

The roll body 100 is formed by rolling up the positive electrode sheet stack 101. FIG. 24 is a sectional view showing the positive electrode sheet stack 101. The positive electrode sheet stack 101 includes a metal foil 121 and positive electrode composite material layers 120A, 120B. The positive electrode composite material layers 120A, 120B are formed respectively on front and back surfaces of the metal foil 121.

Back to FIG. 23, an electrode sheet manufacturing apparatus 110 is used to form the positive electrode sheet. The electrode sheet manufacturing apparatus 110 includes a reeling-out device 111 and a cutting device 112.

The reeling-out device 111 includes a roller device 113 and a roller device 114. The cutting device 112 cuts the positive electrode sheet stack 101 at a position between the roller device 113 and the roller device 114.

Figure 25:
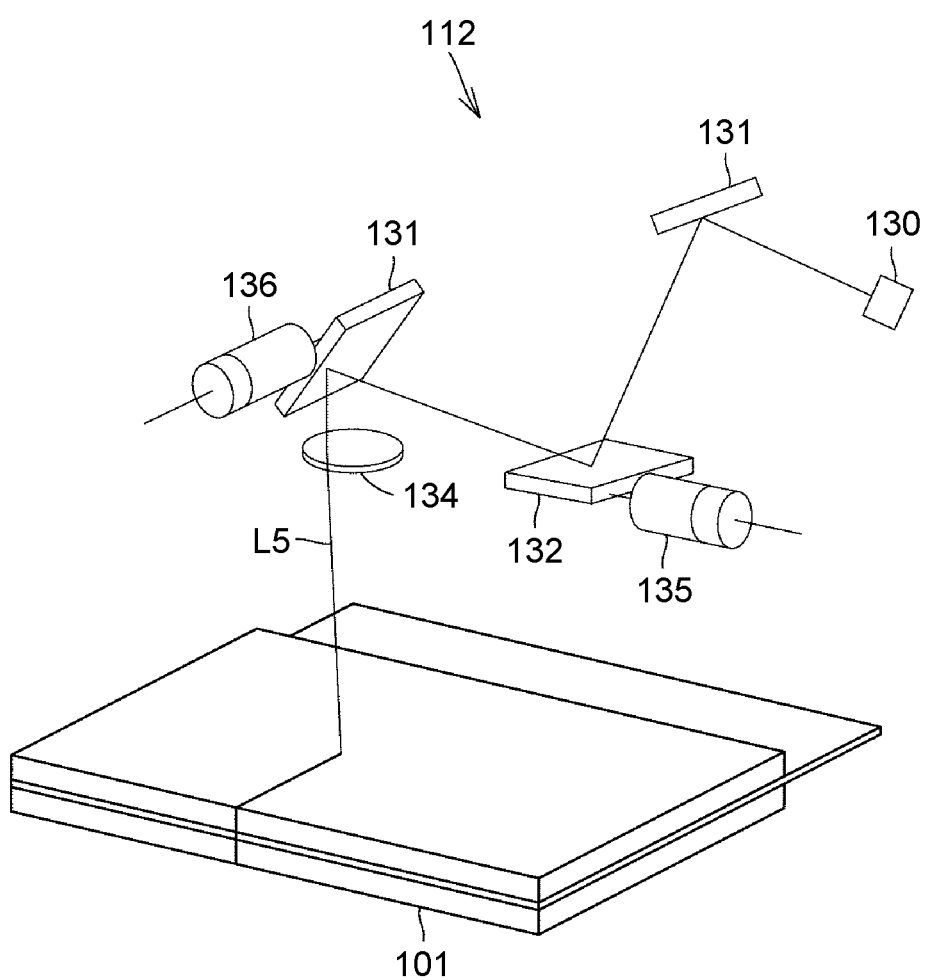
FIG. 25 is a perspective view schematically showing a cutting device 112.

FIG. 25 is a perspective view schematically showing the cutting device 112. The cutting device 112 is similar in configuration to the cutting device 62.

The cutting device 112 includes a laser beam oscillator 130, a one-way mirror 131, an X-axis scanning mirror 132, a Y-axis scanning mirror 133, an fθ mirror 134, and motors 135, 136. For example, an ytterbium fiber laser is used for the laser beam oscillator 130. For example, a laser beam L5 has a wavelength of not shorter than 300 nm nor longer than 2000 nm. In this embodiment, the wavelength of the laser beam L5 is 1064 nm. The positive electrode composite material layers 120A, 120B have high absorption rates of a laser beam in the range of wavelengths from not shorter than 300 nm to not longer than 2000 nm.

Figure 26:
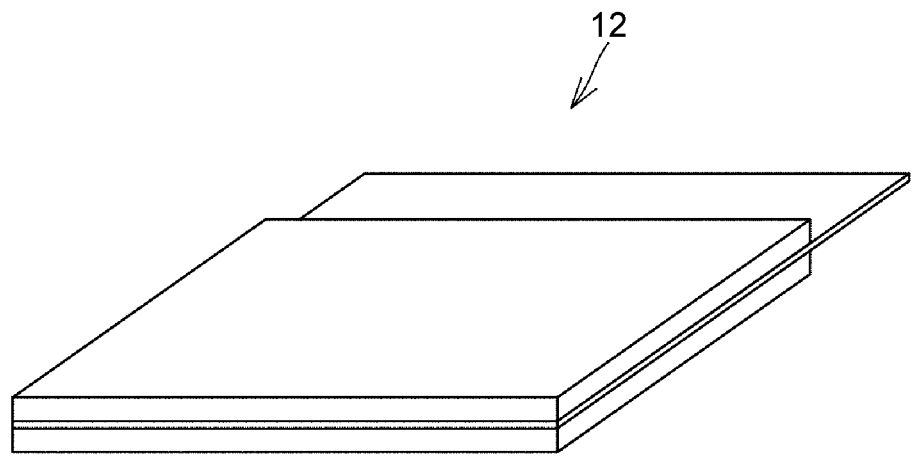
FIG. 26 is a perspective view showing a state where the positive electrode sheet stack 101 has been cut.

The positive electrode sheet stack 101 is irradiated with the laser beam L5 to cut the positive electrode sheet stack 101. FIG. 26 is a perspective view showing a state where the positive electrode sheet stack 101 has been cut. The positive electrode sheet 12 can be formed by cutting the positive electrode sheet stack 101 to a predetermined length.

Figure 27:
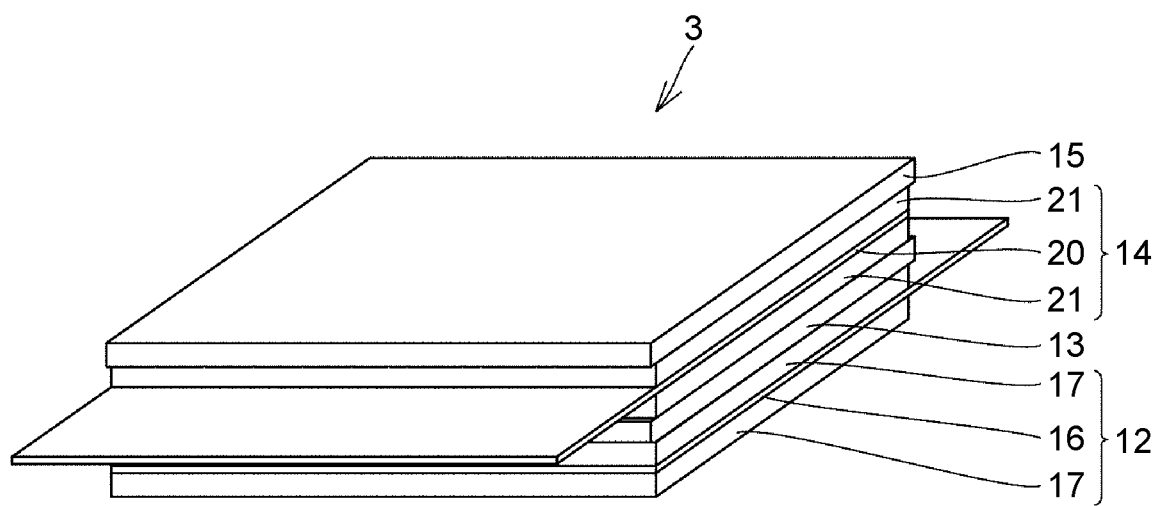
FIG. 27 is a perspective view schematically showing a stacking step S11.

FIG. 27 is a perspective view schematically showing the stacking step S11. In the stacking step S11, the electrode body 3 is formed by stacking the sheets formed in the sheet preparing step S10.

Since formation of raised portions along edges of the separator 15 and the separator 13 in the cutting step S22 is suppressed, even when pluralities of separators 13, 15 are stacked, the dimensions of the manufactured electrode body 3 can be prevented from significantly deviating from the preset dimensions of the electrode body 3. Thus, the current collector body forming step S2 shown in FIG. 5 ends.

Figure 28:
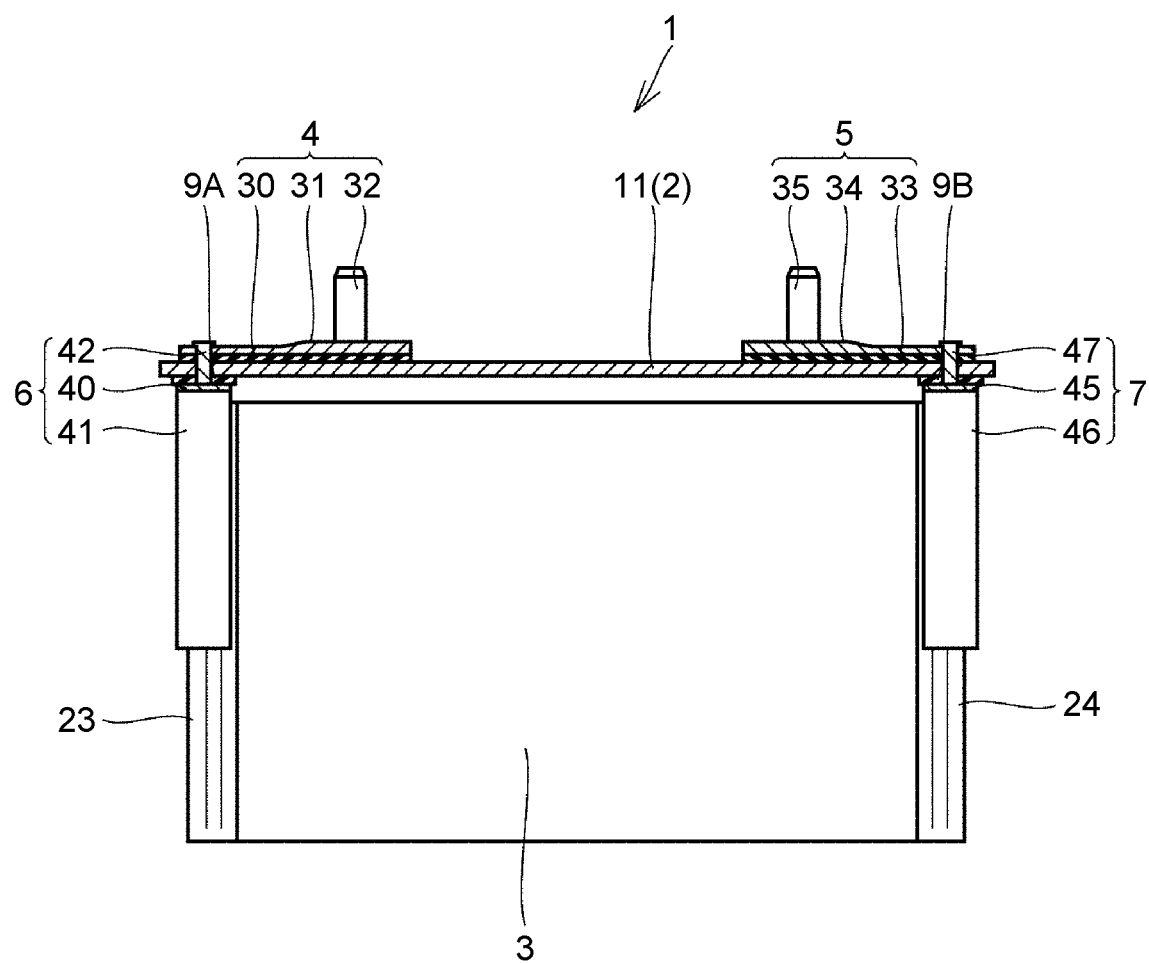
FIG. 28 is a front view showing a current collector body welding step S3.

FIG. 28 is a front view showing the current collector body welding step S3. In the current collector body welding step S3, the positive electrode current collector terminal 6 is welded to the positive electrode 23 of the electrode body 3 and the negative electrode current collector terminal 7 is welded to the negative electrode 24 thereof.

In the housing step S4 shown in FIG. 5, the electrode body 3 is housed into the housing case 2 and the lid 11 is disposed along the edges of the opening of the case main body 10. Then, the lid 11 is welded along the edges of the opening of the case main body 10.

In the electrolyte pouring step S5, the electrolyte 8 is poured into the housing case 2 through an electrolyte filling port formed in the lid 11. In the sealing step S6, this filling port is sealed. Thus, the power storage device 1 can be manufactured.

Next, the distance L3 between the laser beam L1 and the laser beam L2 in the cutting step S22 will be described. Specifically, the distance L3 between the irradiation position P1 of the laser beam L1 and the irradiation position P2 of the laser beam L2 in a scanning direction D2 in FIG. 15 will be described using FIG. 29.

Figure 29:
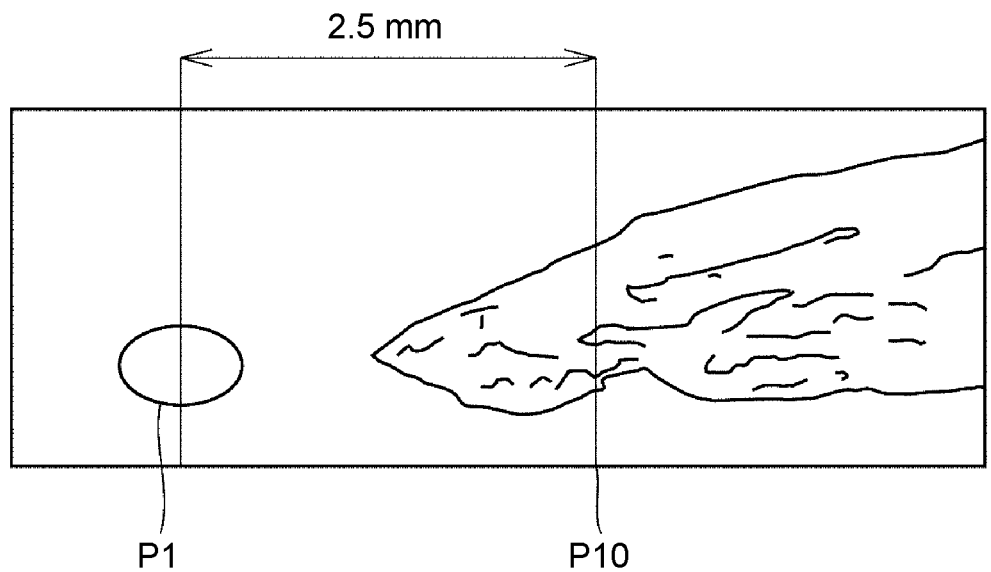
FIG. 29 is a schematic view schematically showing an irradiation position of a laser beam and a melting point of the separator sheet 56.

FIG. 29 shows an experiment that was conducted to calculate the distance L3. FIG. 29 is a schematic view schematically showing an irradiation position of a laser beam and a melting point of the separator sheet 56.

In the experiment shown in FIG. 29, the laser beam L1 was scanned in a predetermined direction in a state of being applied to the separator sheet 56, and the distance between the melting point of the separator sheet 56 and the irradiation position of the laser beam L1 was measured.

In this experiment, the scanning speed (cutting speed) of the laser beam L1 over the separator sheet 56 was 1000 mm/s. A melting point P10 in FIG. 29 represents a point at which the separator sheet 56 started to melt. A distance L4 is the distance between the irradiation position P1 and the melting point P10 in the scanning direction.

The distance between the irradiation position P1 and the melting point P10 in FIG. 29 is 2.5 mm. It can be seen that, since the scanning speed of the laser beam L1 over the separator sheet 56 is 1000 mm/s, there is a time lag of 2.5 ms between when the separator sheet 56 is irradiated with the laser beam L1 and when the separator sheet 56 melts. It can be seen that the cut opening 90 is formed as the separator sheet 56 melts and then contracts on both sides of the scanning route R1 of the laser beam L1.

In the cutting step S22 of the embodiment, it is necessary that the cut opening 90 is formed before the laser beam L2 is applied. Therefore, the distance L3 shown in FIG. 15 can be set by the following Formulae (1) and (2):

$$\text{Distance } L3 \geq \text{value } T \quad (1)$$

$$\text{Value } T = (\text{cutting speed (mm/s) of laser beam } L2) \times 2.5 \text{ ms} \quad (2)$$

Here, the cutting speed of the laser beam L2 means a moving speed of the irradiation position P2 of the laser beam L2 over the separator sheet 56. The value T is a value obtained by multiplying the moving speed of the irradiation position P2 of the laser beam L2 over the separator sheet 56 and a time from when the laser beam L1 is applied until when the separator sheet 56 melts.

With the distance L3 set as described above, the laser beam L2 can be applied after the cut opening 90 is formed, and therefore the laser beam L2 can be appropriately applied to the negative electrode sheet 52. Thus, the negative electrode sheet stack 51 can be appropriately cut.

Moreover, in the cutting step S22 according to the embodiment, the separator sheet 56 is cut by using the galvanoscanner cutting device 62.

With the galvanoscanner cutting device 62, the irradiation position of the laser beam L1 and the irradiation position of the laser beam L2 are arranged on a straight line. Therefore, the upper limit value of the distance L3 between the irradiation position of the laser beam L1 and the irradiation position of the laser beam L2 is the length of the negative electrode sheet stack 51 in the width direction.

In the above embodiment, the example where the single galvanoscanner cutting device 62 is used has been described. In a case where a cutting device that applies the laser beam L1 and a cutting device that applies the laser beam L2 are prepared, the irradiation position of the laser beam L1 and the irradiation position of the laser beam L2 can be set as appropriate.

Thus, the upper limit value of the distance L3 between the irradiation position of the laser beam L1 and the irradiation position of the laser beam L2 varies according to the specifications of the cutting device 62 and the number of cutting devices 62 used.

Next, the cutting step S22 will be described based on a comparison between the cutting step S22 of Example and a cutting step S22 of Comparative Example.

In both Example and Comparative Example, the negative electrode sheet stack 51 shown in FIG. 10 is cut. In Example and Comparative Example, the negative electrode sheet stack 51 is a copper foil and has a thickness of 10 μm.

The negative electrode composite material layer 53A contains a negative electrode active material and a binder. For example, the negative electrode active material is natural graphite particles having a particle size of approximately 80 μm. The binder contains sodium carboxymethylcellulose (CMC) and styrene-butadiene rubber (SBR).

For example, the content of CMC is 1 wt % and the content of SBR is 1 wt %. The separator sheets 56, 55 are polyethylene porous films, and the thickness of the separator sheets 55, 56 is 20 μm, for example.

In the cutting step S22 according to Example, the negative electrode sheet stack 51 was cut by using the laser beam L1 and the laser beam L2. The distance L3 between the irradiation position of the laser beam L1 and the irradiation position of the laser beam L2 was 1.2 mm.

In the cutting step S22 according to Comparative Example, the negative electrode sheet stack 51 was cut by using the laser beam L2. The oscillators, the wavelengths, etc. of the laser beam L1 and the laser beam L2 are as shown in Table 1 below.

TABLE 1

|  | Laser beam L1 | Laser beam L2 |
|---|---|---|
| Oscillator | Thulium fiber laser | Ytterbium fiber laser |
| Wavelength | 2000 nm | 1070 nm |
| Output power | 100 W | 700 W |
| Spot diameter | 50 μm | 50 μm |

Table 2 below shows the result of implementation of Example and Comparative Example and evaluation of the result.

TABLE 2

| | Laser beam L1 | Laser beam L2 | Cuttable speed | Width of separator melted |
|---|---|---|---|---|
| Comparative Example | Not used | Used | 0.5 m/sec | 0.47 mm |
| Example | Used | Used | 2 m/sec | 0.25 mm |

As shown in Table 2 above, in the cutting step S22 according to Comparative Example, the scanning speed (cutting speed) of the laser beam L2 at which the negative electrode sheet stack 51 could be cut was 0.5 m/sec. In the cutting step S22 according to Example, the scanning speed (cutting speed) of the laser beam L2 at which the negative electrode sheet stack 51 could be cut was 2 m/sec. Thus, it can be seen that the cutting step S22 according to Example is faster than that according to Comparative Example.

Next, a cut state in the cutting step S22 according to Example and a cut state in the cutting step S22 according to Comparative Example will be described using photographs, etc.

Figure 30:
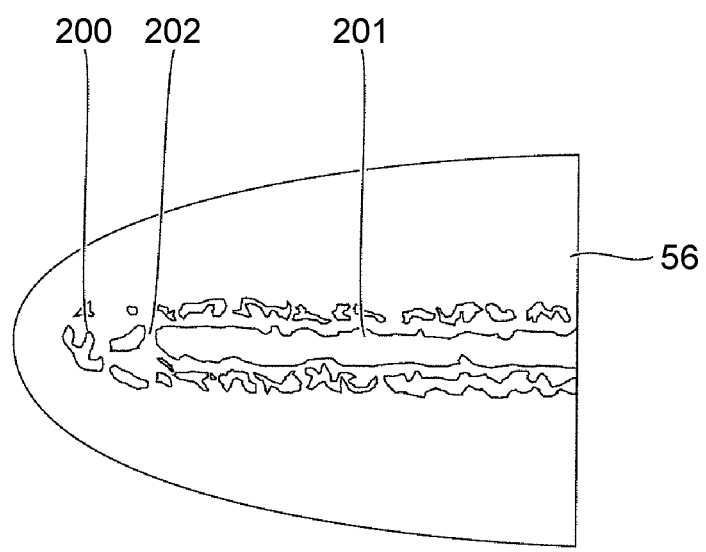
FIG. 30 is a plan view schematically showing a cutting step S22 according to Comparative Example.

FIG. 30 is a plan view schematically showing the cutting step S22 according to Comparative Example. In FIG. 30, a portion 200 is an area having been irradiated with the laser beam L2, and a portion 201 is an area in which the separator sheet 56 is cut. A portion 202 is located farther on a rear side than the portion 200 in the scanning direction of the laser beam L2, and at the portion 202, the melting separator sheet 56 is formed so as to overlap the portion 201.

In the cutting step S22 according to Comparative Example, when the laser beam L2 is applied, the energy of the laser beam L2 is not absorbed in the separator sheet 56 but absorbed in the negative electrode composite material layer 53A.

When the energy of the laser beam L2 is absorbed in the negative electrode composite material layer 53A, the temperature of the negative electrode composite material layer 53A rises, and the natural graphite particles composing the negative electrode composite material layer 53A tend to scatter to the outside. However, the separator sheet 56 formed on the upper surface of the negative electrode composite material layer 53A remains, which prevents the natural graphite particles from scattering to the outside.

The separator sheet 56 melts as the heat of the negative electrode composite material layer 53A having reached a high temperature is transferred to the separator sheet 56. As a result, at the portion 202, the melted separator sheet 56 is formed so as to straddle the portion 202.

Then, the melted separator sheet 56 breaks and at the same time contracts, so that the separator sheet 56 breaks at a position farther on the rear side than the portion 202.

Figure 31:
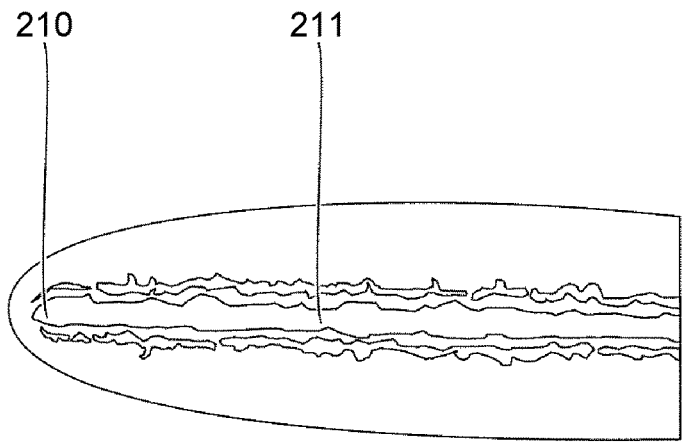
FIG. 31 is a schematic view schematically showing the negative electrode sheet stack 51 when irradiation with the laser beam L1 is stopped in a cutting process of the cutting step S22 according to Example.

FIG. 31 is a schematic view schematically showing the negative electrode sheet stack 51 when irradiation with the laser beam L1 is stopped in the cutting process of the cutting step S22 according to Example.

A portion 210 is a position at which the laser beam L1 has been applied. A portion 211 is an area in which the separator sheet 56 is cut.

As shown in FIG. 31 etc., the separator sheet 56 is cut on an immediately rear side of the portion 210 that is the irradiation position of the laser beam L1. Thus, unlike in Comparative Example, there is no area where the separator sheet 56 melted on the rear side of the irradiation position of the laser beam remains.

A presumable cause of this phenomenon is that the energy of the laser beam L1 is absorbed in the separator sheet 56 that has a high absorption rate of the laser beam L1. That is, in Comparative Example, the separator sheet 56 is melted by the heat transferred from the negative electrode composite material layer 53A, whereas in Example, the separator sheet 56 is melted directly by the energy from the laser beam L1. As a result, the separator sheet 56 is appropriately cut in Example.

Figure 32:
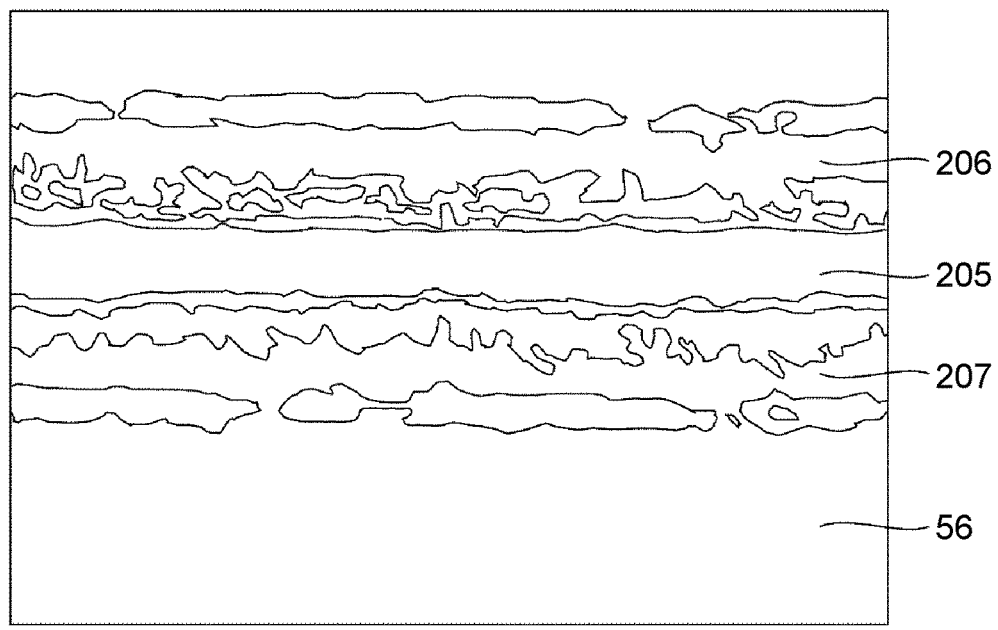
FIG. 32 is a schematic view schematically showing a state of the negative electrode sheet stack 51 after being cut in the cutting step S22 of Comparative Example.

FIG. 32 is a schematic view schematically showing the state of the negative electrode sheet stack 51 after being cut in the cutting step S22 of Comparative Example.

Figure 33:
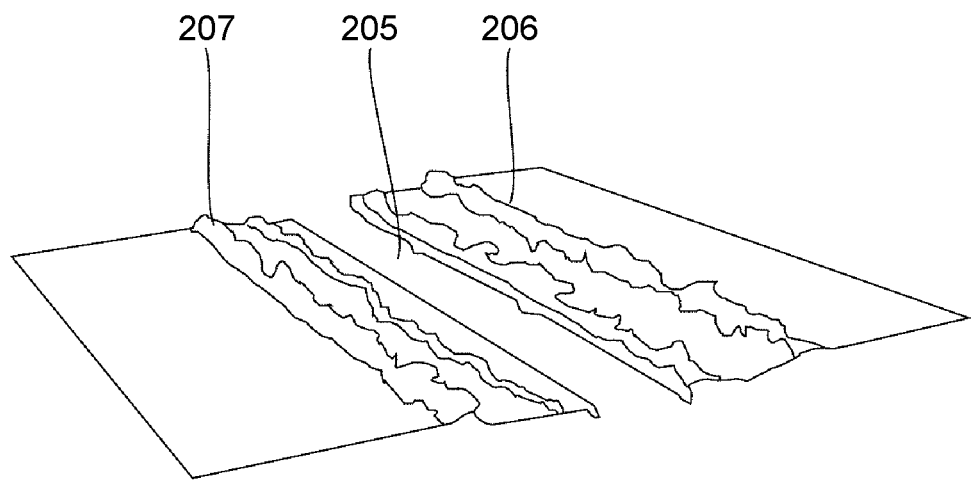
FIG. 33 is a perspective view schematically showing the negative electrode sheet stack 51 shown in FIG. 32.
Figure 34:
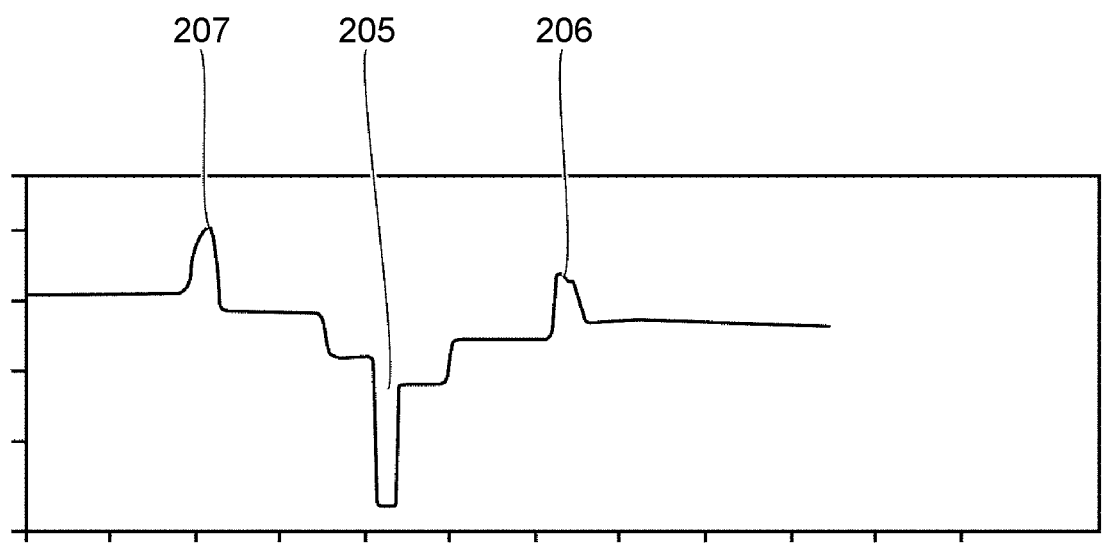
FIG. 34 is a graph schematically showing the sectional shape of the negative electrode sheet stack 51 after being cut in the cutting step S22 of Comparative Example.

FIG. 33 is a perspective view schematically showing the negative electrode sheet stack 51 shown in FIG. 32. FIG. 34 is a graph schematically showing the sectional shape of the negative electrode sheet stack 51 after being cut in the cutting step S22 of Comparative Example.

Figure 35:
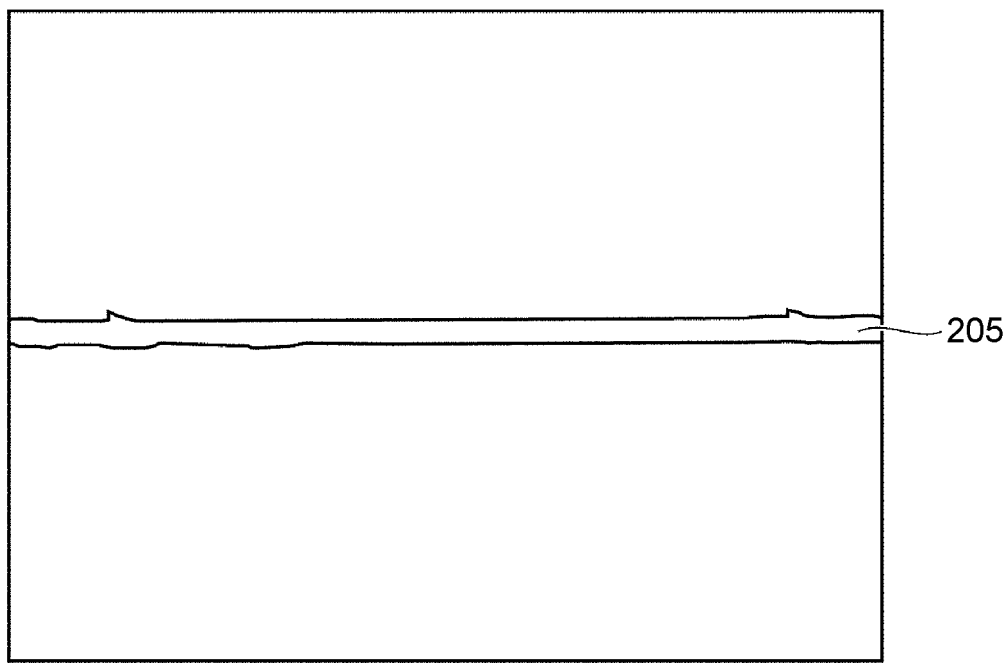
FIG. 35 is a plan view schematically showing the shape of the negative electrode sheet stack 51 after being cut in the cutting step S22 of Example.
Figure 36:
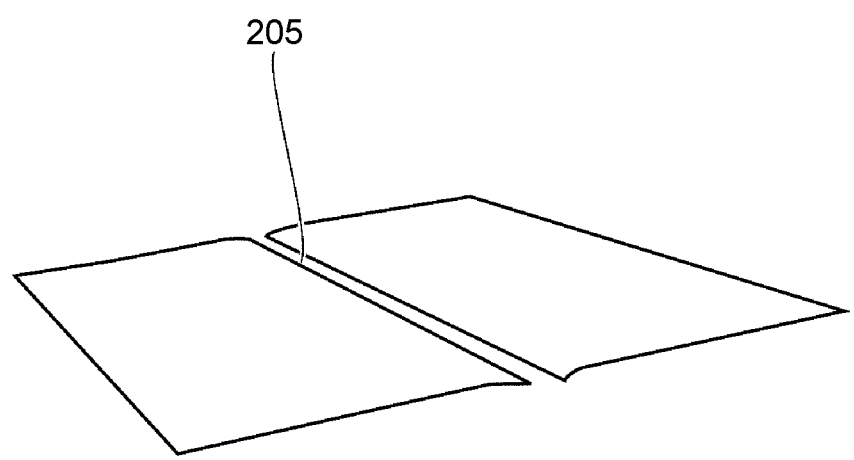
FIG. 36 is a perspective view schematically showing the negative electrode sheet stack 51 shown in FIG. 35.
Figure 37:
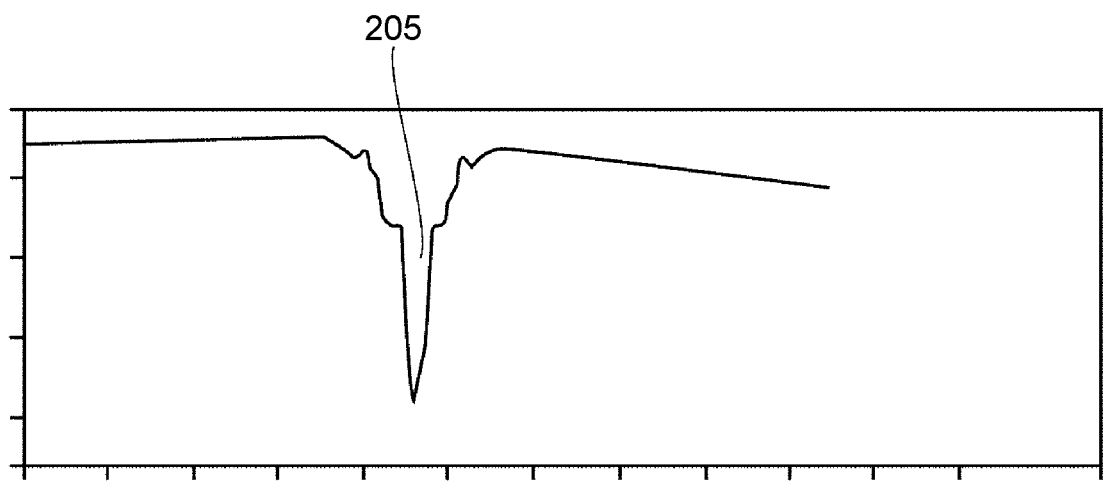
FIG. 37 is a graph schematically showing the sectional shape of the negative electrode sheet stack 51 in the cutting step S22 of Example.

FIG. 35 is a plan view schematically showing the shape of the negative electrode sheet stack 51 after being cut in the cutting step S22 of Example. FIG. 36 is a perspective view schematically showing the negative electrode sheet stack 51 shown in FIG. 35. FIG. 37 is a graph schematically showing the sectional shape of the negative electrode sheet stack 51 in the cutting step S22 of Example.

Referring to FIG. 32 to FIG. 37, in the cutting step S22 of Comparative Example, a raised portion 206 and a raised portion 207 are formed respectively on both sides of a cut area 205 when the negative electrode sheet stack 51 is cut.

Thus, in an upper surface of the negative electrode sheet 14, the raised portion 206 is formed at the side of one of two cut surfaces (side surfaces) and the raised portion 207 is formed at the side of the other cut surface. The height of the raised portion 206 and the raised portion 207 is approximately 0.1 mm.

Therefore, if a plurality of negative electrode sheets 14 and a plurality of positive electrode sheets 12 formed in the cutting step S22 according to Comparative Example are stacked, pluralities of raised portions 206, 207 overlap one another. As a result, the electrode body 3 in FIG. 2 is shaped so as to bulge at an upper surface side and a lower surface side and be recessed at a central part.

By contrast, as shown in FIG. 35 to FIG. 37, no large raised portions are formed on either side of a cut area 205 in the cutting step S22 according to Example. Therefore, even when pluralities of separators 13, negative electrode sheets 14, and separators 15 are stacked in the stacking step, the electrode body 3 can be formed in a flat planar shape.

Moreover, as shown in FIG. 36 and FIG. 37, corners on both sides of the cut area 205 are rounded. Therefore, when the separators 15, 13 are conveyed by the reeling-out device 61, etc., interference between cut areas of the separators 15, 13 is suppressed, and a defect such as peeling of the separators 15, 13 can be suppressed.

Furthermore, in Example, the total output power of the output power of the laser beam L1 and the output power of the laser beam L2 is 600 W. By contrast, the output power of the laser beam L2 according to Comparative Example is 1300 W. Thus, the cutting step S22 according to Example can cut the negative electrode sheet stack 51 with low output power.

Figure 38:
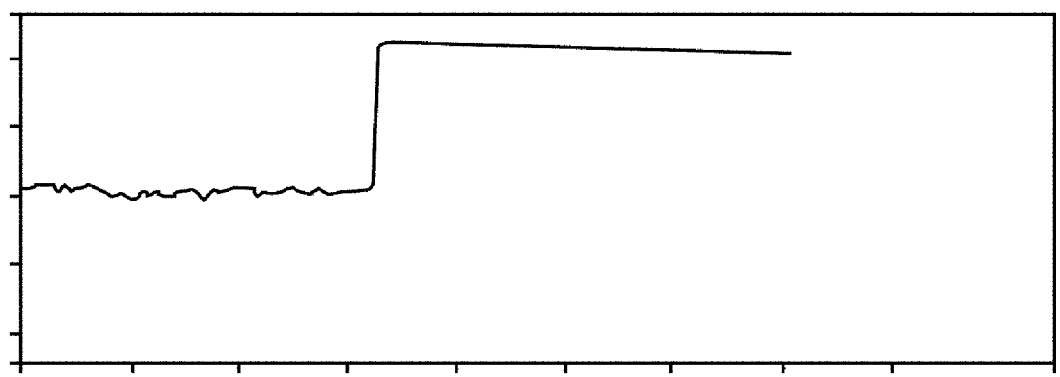
FIG. 38 is a graph schematically showing the sectional shape of the negative electrode sheet stack 51 cut by a cutting tool.

Next, a case where the negative electrode sheet stack 51 is cut by a cutting tool will be described. FIG. 38 is a graph schematically showing the sectional shape of the negative electrode sheet stack 51 cut by the cutting tool.

It can be seen from FIG. 38 that, also when the negative electrode sheet stack 51 is cut by using the cutting tool, the negative electrode sheet stack 51 can be cut to some degree appropriately. However, since the cut surface of the negative electrode sheet stack 51 is perpendicular to the upper surface thereof, the separators 13, 15 may peel while the cut separators 13, 15 and negative electrode sheet 14 are conveyed by the roller device 64, etc. Moreover, when the negative electrode sheet stack 51 is cut by a cutting tool, the cutting tool will deteriorate after repeatedly cutting the negative electrode sheet stack 51.

Depending on the degree of deterioration of the cutting tool, the cutting tool can no longer appropriately cut the negative electrode sheet stack 51, which results in a lower yield. On the other hand, frequently replacing the cutting tool will increase the manufacturing cost of the power storage device 1.

However, the cutting step S22 according to Example can suppress such an inconvenience.

While the embodiment and Example based on the present disclosure have been described above, the matters disclosed herein are in every respect merely illustrative and not restrictive. The technical scope of the present disclosure is defined by the claims, and is intended to include all modifications that are equivalent in meaning and scope to the claims.

What is claimed is:

1. A power storage device manufacturing method comprising:
    preparing a sheet stack including an electrode composite material layer and a separator provided on the electrode composite material layer;
    irradiating the separator of the sheet stack with a first laser beam having a wavelength to be absorbed by the separator, and moving an irradiation position of the first laser beam relative to the sheet stack; and
    irradiating the sheet stack having been irradiated with the first laser beam with a second laser beam having a wavelength to be absorbed by the electrode composite material layer, and moving an irradiation position of the second laser beam relative to the sheet stack, wherein
    the irradiation position of the second laser beam moves so as to follow a track of the irradiation position of the first laser beam; and
    wherein a distance between the irradiation position of the first laser beam and the irradiation position of the second laser beam in a moving direction of the first laser beam in the sheet stack is equal to or larger than a value obtained by multiplying a time from when the separator is irradiated with the first laser beam until when the separator melts and a moving speed of the irradiation position of the second laser beam.

2. The power storage device manufacturing method according to claim 1, further comprising conveying the sheet stack in a conveying direction, wherein the sheet stack being conveyed in the conveying direction is irradiated with the first laser beam and the second laser beam, and the irradiation position of the first laser beam and the irradiation position of the second laser beam move in the conveying direction as well as in a width direction of the sheet stack.

3. The power storage device manufacturing method according to claim 1, wherein output power of the second laser beam is higher than output power of the first laser beam.

4. The power storage device manufacturing method according to claim 1, wherein:
    a wavelength of the first laser beam is within a range from 1500 nm to 3000 nm;
    a wavelength of the second laser beam is within a range from 300 nm to 2000 nm; and
    the wavelength of the first laser beam is longer than the wavelength of the second laser beam.

* * * * *